US 6,675,649 B2

(12) United States Patent
Uchiyama et al.

(10) Patent No.: US 6,675,649 B2
(45) Date of Patent: Jan. 13, 2004

(54) ACCELERATION DETECTION DEVICE, METHOD OF DETECTING ACCELERATION, INPUT DEVICE, AND RECORDING MEDIUM

(75) Inventors: Takuya Uchiyama, Shinagawa (JP); Masayuki Kato, Shinagawa (JP); Norio Endo, Shinagawa (JP)

(73) Assignee: Fujitsu Takamisawa Component Limited, Tokyo (JP)

( * ) Notice: Subject to any disclaimer, the term of this patent is extended or adjusted under 35 U.S.C. 154(b) by 252 days.

(21) Appl. No.: 09/822,360

(22) Filed: Apr. 2, 2001

(65) Prior Publication Data

US 2001/0029783 A1 Oct. 18, 2001

(30) Foreign Application Priority Data

Apr. 17, 2000 (JP) ........................................ 2000-115174

(51) Int. Cl.[7] ............................................... G01P 15/00
(52) U.S. Cl. .......................................... 73/488; 73/1.37
(58) Field of Search ................. 73/488, 489, 1.37, 73/579, 587, 602, 609, 610, 611, 498, 516.32; 702/56, 141

(56) References Cited

U.S. PATENT DOCUMENTS

| | | | | |
|---|---|---|---|---|
| 3,965,314 A | * | 6/1976 | Sasaya et al. ............ 200/61.53 |
| 4,699,006 A | * | 10/1987 | Boxenhorn .................. 73/517 |
| 5,000,030 A | * | 3/1991 | Umeda et al. ............... 73/1.39 |
| 5,107,448 A | * | 4/1992 | Nash ........................... 702/141 |
| 5,383,364 A | | 1/1995 | Takahashi et al. ....... 73/514.32 |
| 5,515,720 A | * | 5/1996 | Remboski et al. ........... 701/110 |
| 5,608,631 A | * | 3/1997 | Tsutsumi et al. ........... 700/304 |
| 5,621,172 A | * | 4/1997 | Wilson et al. ................ 73/579 |
| 5,625,348 A | * | 4/1997 | Farnsworth et al. ........ 324/323 |
| 5,754,964 A | * | 5/1998 | Rettig et al. .................. 701/35 |
| 5,897,606 A | * | 4/1999 | Miura et al. .................... 360/5 |
| 6,002,336 A | * | 12/1999 | Widding et al. ........ 340/323 R |
| 6,353,782 B1 | * | 3/2002 | Kunimi et al. ................ 701/45 |
| 6,411,921 B1 | * | 6/2002 | Schiltz et al. ............... 702/182 |
| 6,450,029 B1 | * | 9/2002 | Sakai et al. .................. 324/661 |

FOREIGN PATENT DOCUMENTS

| | | |
|---|---|---|
| JP | 6-4208 | 1/1994 |
| JP | 11-353109 | 12/1999 |
| JP | 2000-47813 | 2/2000 |

OTHER PUBLICATIONS

Micromachine Technology (IX), obtained from www.m-mc.or.jp/no.15/tec15/mmtec15.htm on Dec. 27, 2002.

* cited by examiner

*Primary Examiner*—Hezron Williams
*Assistant Examiner*—Jacques Saint-Surin
(74) *Attorney, Agent, or Firm*—Staas & Halsey LLP

(57) ABSTRACT

An acceleration detection device for detecting an acceleration applied in a certain direction based on detection signals corresponding to the acceleration, is provided with a waveform detection part detecting waveforms of the detection signals and an acceleration determination part determining whether to make valid or invalid the acceleration based on the waveforms detected in the waveform detection part.

29 Claims, 20 Drawing Sheets

FIG. 1 PRIOR ART
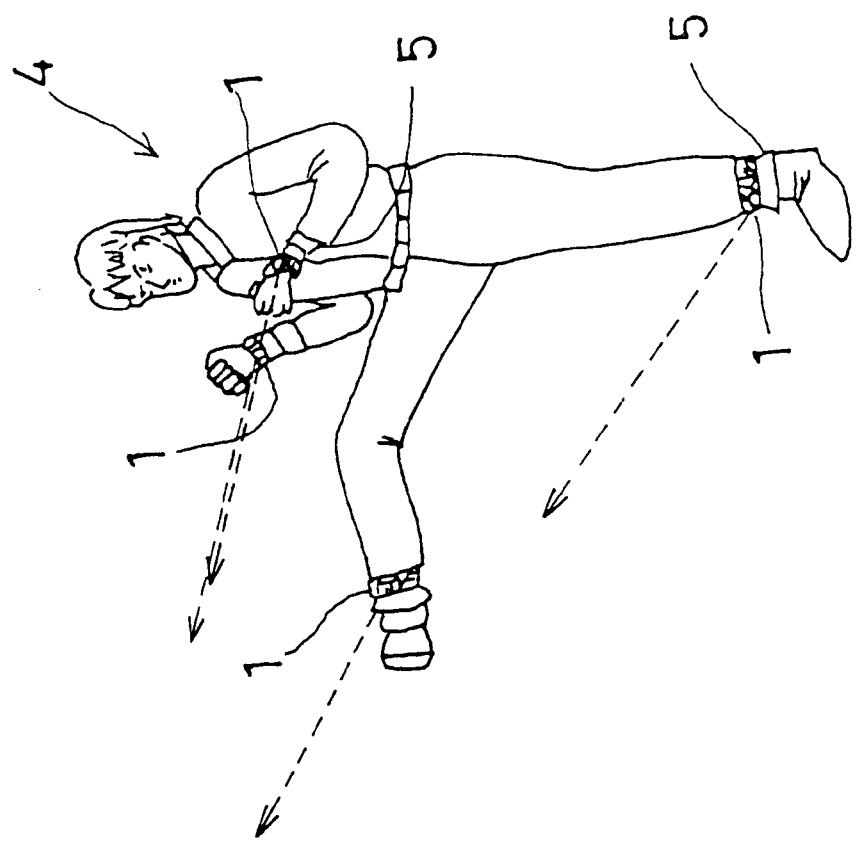
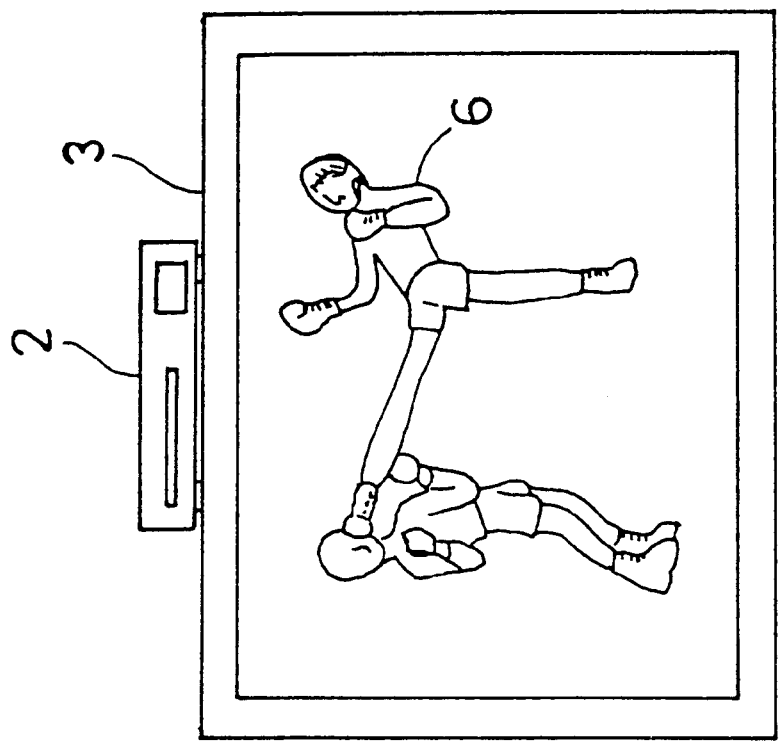

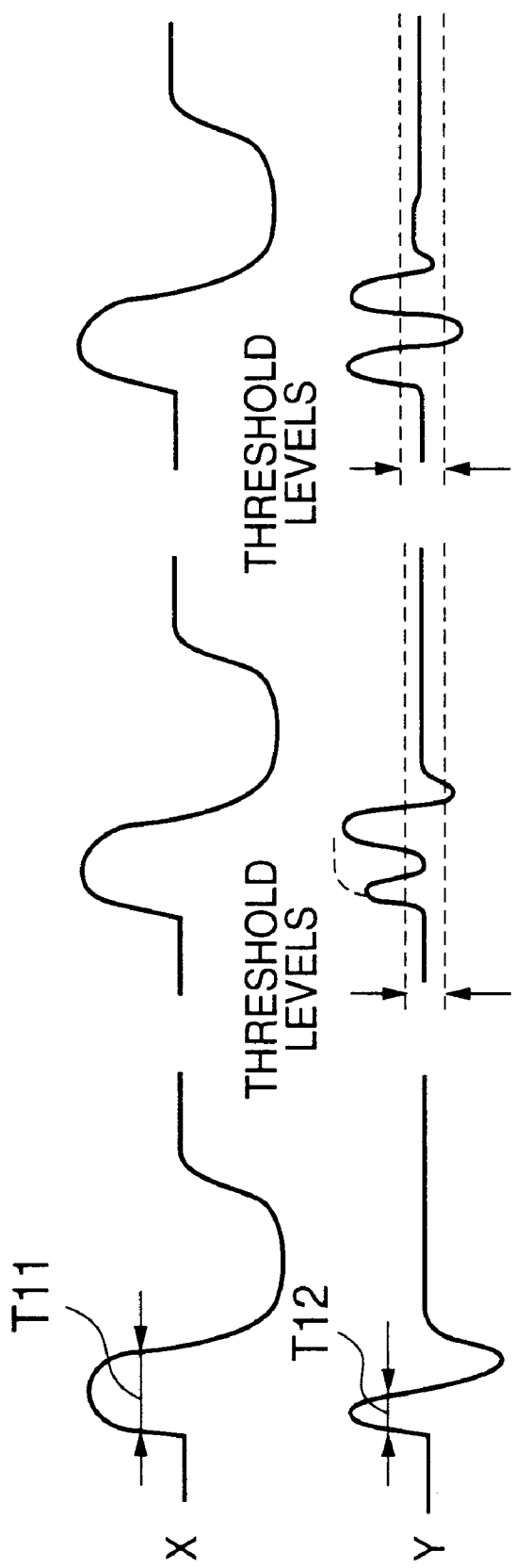

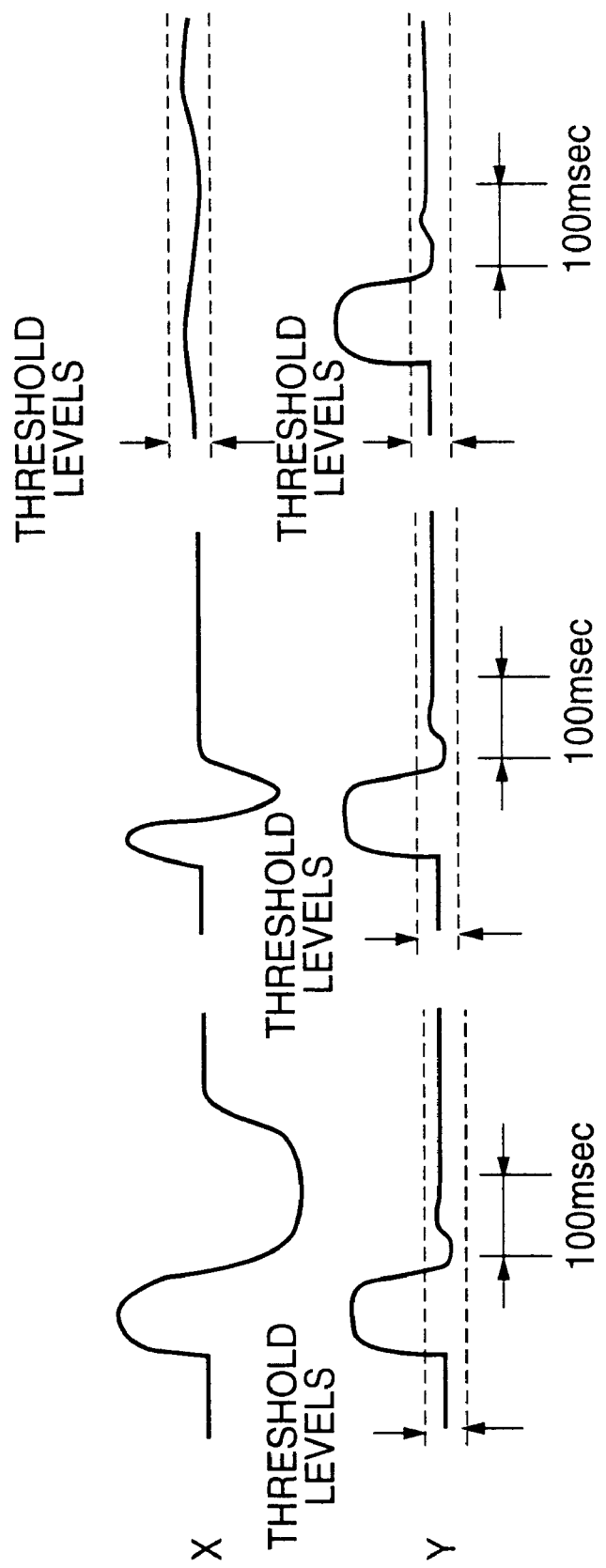

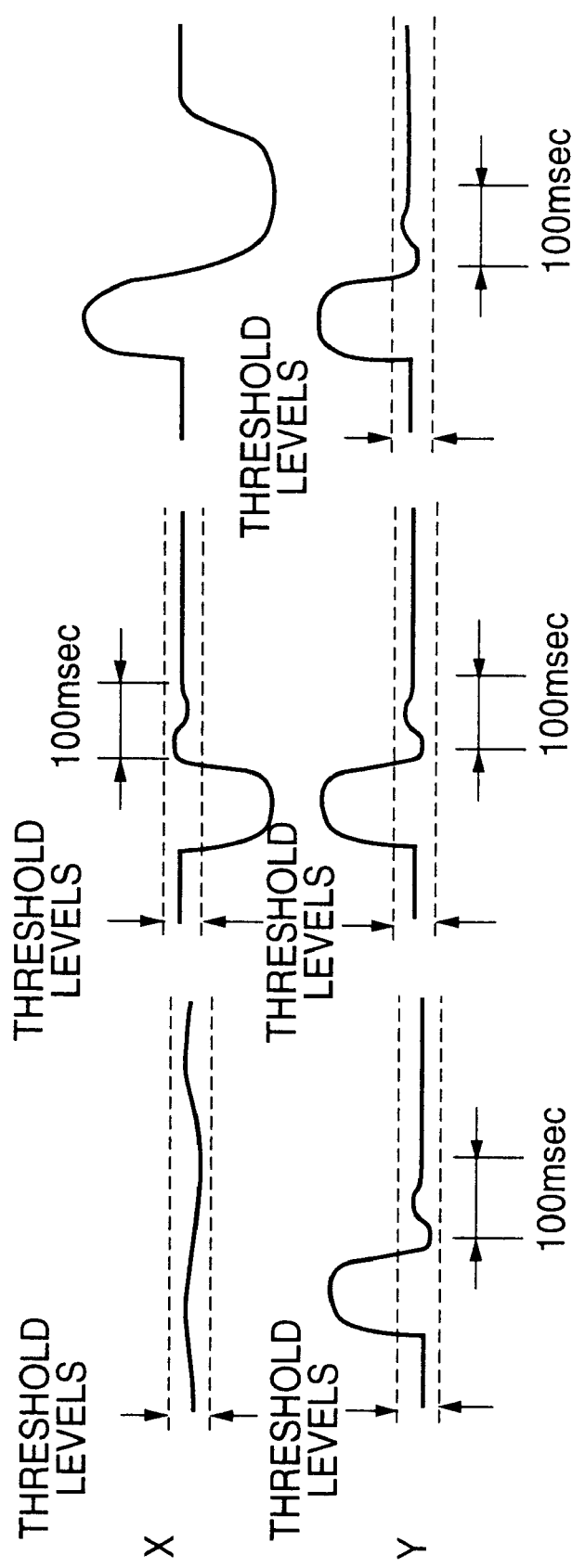

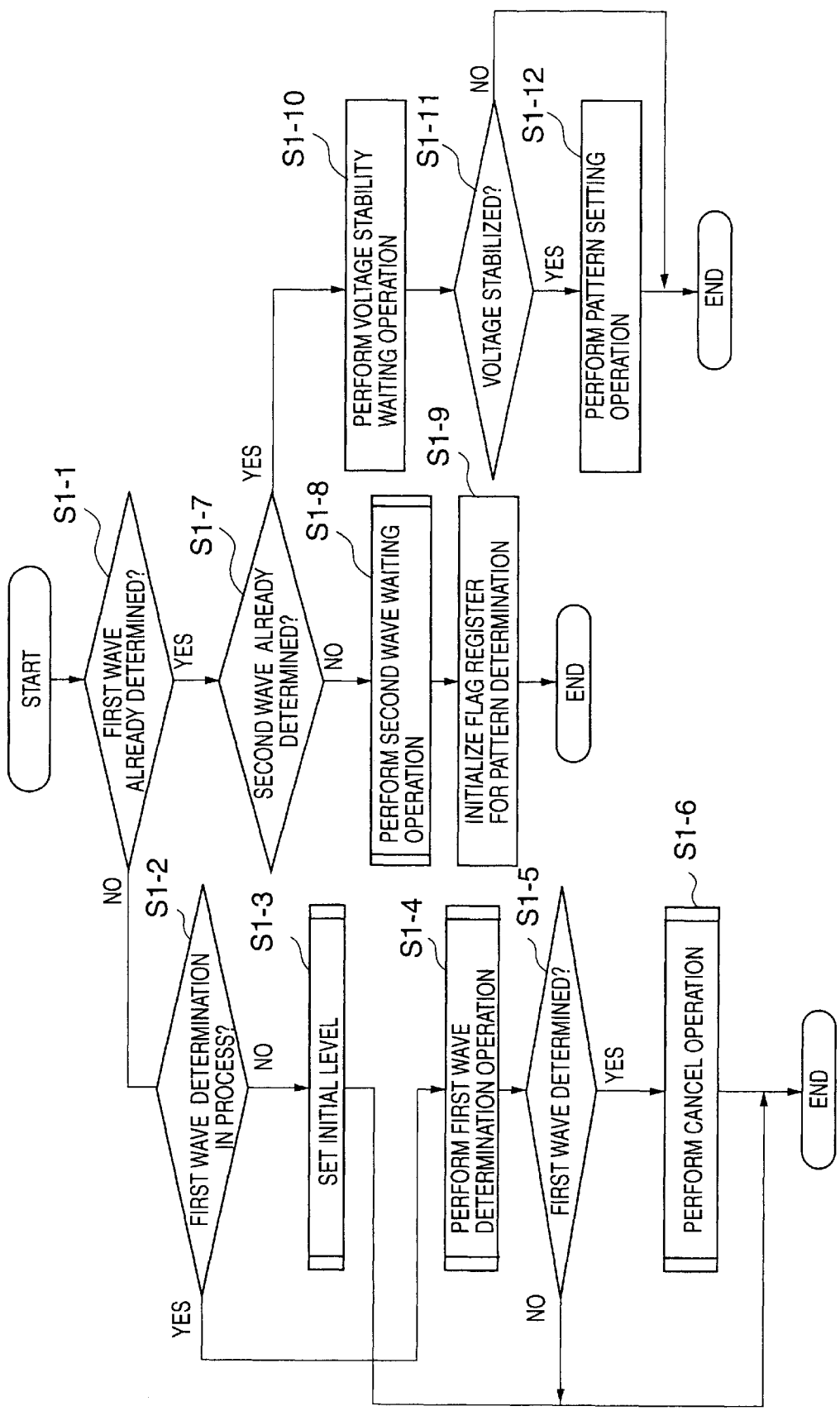

ACCELERATION DETECTION DEVICE, METHOD OF DETECTING ACCELERATION, INPUT DEVICE, AND RECORDING MEDIUM

BACKGROUND OF THE INVENTION

1. Field of the Invention

The present invention generally relates to acceleration detection devices, methods of detecting acceleration, input devices, and recording media, and more particularly to an acceleration detection device which detects acceleration based on input signals from a sensor, a method of detecting acceleration which method employs such an acceleration detection device, an input device including such an acceleration detection device, and a recording medium storing a program for detecting acceleration.

Recently, a variety of ideas have been proposed in the field of game apparatuses, and a variety of input methods have been required, accordingly. Required as one of such input methods is an input device for detecting movements of arms and legs. Detection of acceleration may be employed as a method of detecting the movements of arms and legs. An acceleration detection sensor employing a spindle or weight and a spring generates vibrations due to the elasticity of the spring, and therefore, is prone to generate a signal having unnecessary components.

2. Description of the Related Art

FIG. 1 is a diagram for illustrating an input method for a game apparatus.

The game apparatus shown in FIG. 1 includes input devices 1, a game machine 2, and a display 3. The input devices 1 are attached to arms and legs 5 of a player 4 to detect accelerations. The accelerations detected by the input devices 1 are transmitted to the game machine 2 by means of infrared.

When the player 4 moves the arms and legs 5, accelerations are generated in accordance with the movements of the arms and legs 5. The input devices 1 detect these accelerations, and transmit the accelerations to the game machine 2. The game machine 2 detects forces exerted on the arms and legs 5 by the accelerations transmitted from the input devices 1, and causes a game character 6 shown in the display 3 to make actions.

FIG. 2 is an exploded perspective view of the conventional input device 1. The input device 1 includes a main body 11 and an attachment band 12.

The main body 11 is attached to one of the arms and legs 5 by means of the attachment band 12 so as to detect accelerations in accordance with the movements of the one of the arms and legs 5 and transmit the detected accelerations to the game machine 2. The main body 11 includes a case 21, a cover 22, a printed circuit board 23, and switch buttons 24.

The printed circuit board 23, on which an acceleration sensor 25, electronic components 26, and a cell 27 are mounted, is housed in a space formed by the case 21 and the cover 22.

FIG. 3 is an exploded perspective view of the conventional acceleration sensor 25.

The acceleration sensor 25 includes Hall elements 33 and an acceleration detection mechanism 32, which are arranged on the printed circuit board 23.

The acceleration mechanism 32 includes a base 41, a housing 42, a lever 43, a helical compression spring 44, a slider 45, and a cover 46. The lever 43 is supported by a support portion 47 of the base 41. The slider 45 is slidably held by the lever 43. The helical compression spring 44 is held in a compressed state between the slider 45 and the housing 42. The housing 42, through which the top end portion of the lever 43 penetrates in a direction indicated by arrow A in FIG. 3, is fixed to the base 41 so that the slider 45 and the helical compression spring 44 are housed between the base 41 and the housing 42.

The lever 43 includes a main body 51, a spindle or weight 52, a permanent magnet 53, and a cap 54. The spindle or weight 52 is fixed to the top end portion of the main body 51, which portion extends outward from the housing 42. The permanent magnet 53 is fixed to the bottom portion of the main body 51. The cap 54 is attached to the bottom portion of the main body 51 to cover the permanent magnet 53.

The cover 46 is fixed to the top end portion of the main body 51 to restrict movements of the main body 51. The acceleration detection mechanism 32 is fixed on the Hall elements 33 arranged on the printed circuit board 23.

FIGS. 4A and 4B are diagrams for illustrating an operation of the conventional acceleration sensor 25. FIG. 4A shows a state in which no acceleration is exerted, and FIG. 4B shows a state in which an acceleration is exerted.

In the state shown in FIG. 4A, the slider 45 is pressed toward the base 41 by the elasticity of the helical compression spring 44 so that the lever 43 is in an upright position.

On the other hand, when the acceleration is exerted on the spindle or weight 52, the lever 43 rotates on the support portion 47 of the base 41, while resisting the elasticity of the helical compression spring 43, as shown in FIG. 4B. As a result, the permanent magnet 53 shifts its position with respect to the Hall elements 33 to change the strength of a magnetic field applied to the Hall elements 33. Since the Hall elements 33 change their outputs depending on the strength of the magnetic field applied thereto, the tilt of the lever 43 is detectable based on the outputs of the Hall elements 33, thus allowing the detection of the acceleration exerted on the spindle or weight 52. Two pairs of the Hall elements 33 are arranged along an X-axis and a Y-axis as shown in FIG. 3 to detect the X-axis and Y-axis components of the acceleration, respectively.

Japanese Laid-Open Patent Application No. 11-353109 discloses the above-described mechanism in detail.

The input device 1 detects the magnitude and direction of the acceleration from the X-axis and Y-axis components detected in the above-described manner, and transmits the detected magnitude and direction of the acceleration to the game machine 2.

However, a conventional acceleration detection device simply detects a signal transmitted from an acceleration sensor as the acceleration, so that even unnecessary components of the signal are detected as noises.

SUMMARY OF THE INVENTION

It is a general object of the present invention to provide an acceleration detection device, a method of detecting acceleration, an input device, and a recording medium in which the above-described disadvantage is eliminated.

A more specific object of the present invention is to provide an acceleration detection device, a method of detecting acceleration, an input device, and a recording medium that allows necessary acceleration components to be extracted with accuracy.

The above objects of the present invention are achieved by an acceleration detection device for detecting an acceleration applied in a certain direction based on detection signals corresponding to the acceleration and including a waveform detection part detecting waveforms of the detection signals and an acceleration determination part determining whether to make valid or invalid the acceleration based on the waveforms detected in the waveform detection part.

The above objects of the present invention are also achieved by a method of detecting an acceleration applied in a certain direction based on detection signals corresponding to the acceleration, which method includes the steps of (a) detecting waveforms of the detection signals, and (b) determining whether to make valid or invalid the acceleration based on the detected waveforms.

The above objects of the present invention are also achieved by an input device including an acceleration detection mechanism outputting detection signals corresponding to an acceleration, a waveform detection part detecting waveforms of the detection signals output from the acceleration detection mechanism, and an acceleration determination part determining whether to make valid or invalid the acceleration based on the waveforms detected in the waveform detection part.

The above objects of the present invention are further achieved by a computer-readable recording medium recorded with a program which causes a computer to detect waveforms of detection signals corresponding to an acceleration and to determine whether to make valid or invalid the acceleration based on the detected waveforms.

According to the present invention, an acceleration is made valid by detecting only signals of waveforms matching the characteristic of a mechanism for detecting acceleration, thus preventing unnecessary acceleration components from being detected.

BRIEF DESCRIPTION OF THE DRAWINGS

Other objects, features and advantages of the present invention will become more apparent from the following detailed description when read in conjunction with the accompanying drawings, in which:

FIG. 1 is a diagram for illustrating an input method for a game apparatus;

FIGS. 8A through 8C are diagrams for illustrating a SHORT operation according to the embodiment of the present invention;

FIGS. 10A through 10C are diagrams for illustrating a NOISE operation according to the embodiment of the present invention;

FIGS. 11A through 11C are diagrams for illustrating a REVERSE operation according to the embodiment of the present invention;

FIG. 13 is a flowchart of a waveform recognition operation according to the embodiment of the present invention;

DETAILED DESCRIPTION OF THE PREFERRED EMBODIMENTS

A description will now be given, with reference to the accompanying drawings, of an embodiment of the present invention.

Figure 2:
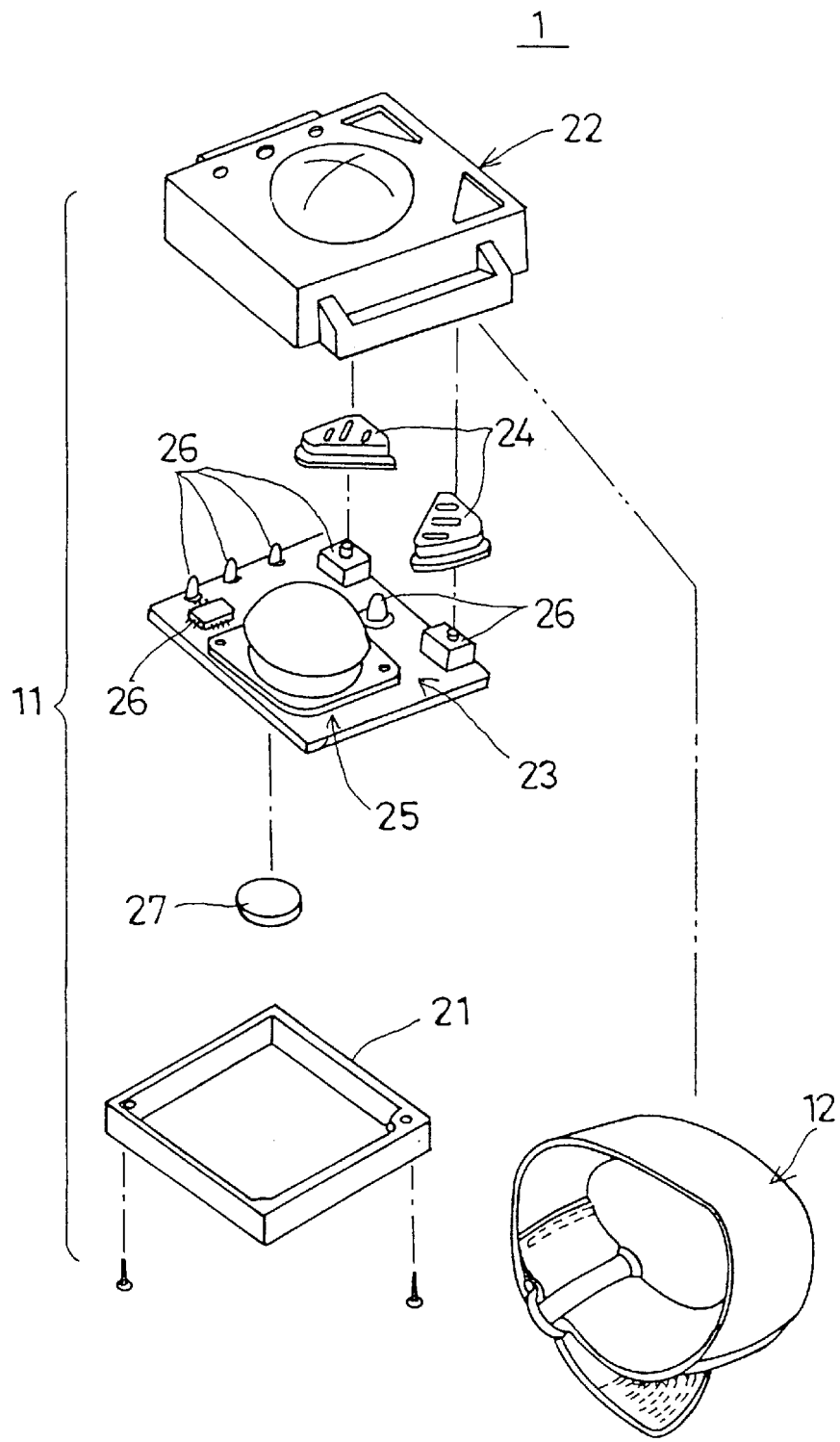
FIG. 2 is an exploded perspective view of a conventional input device.
Figure 3:
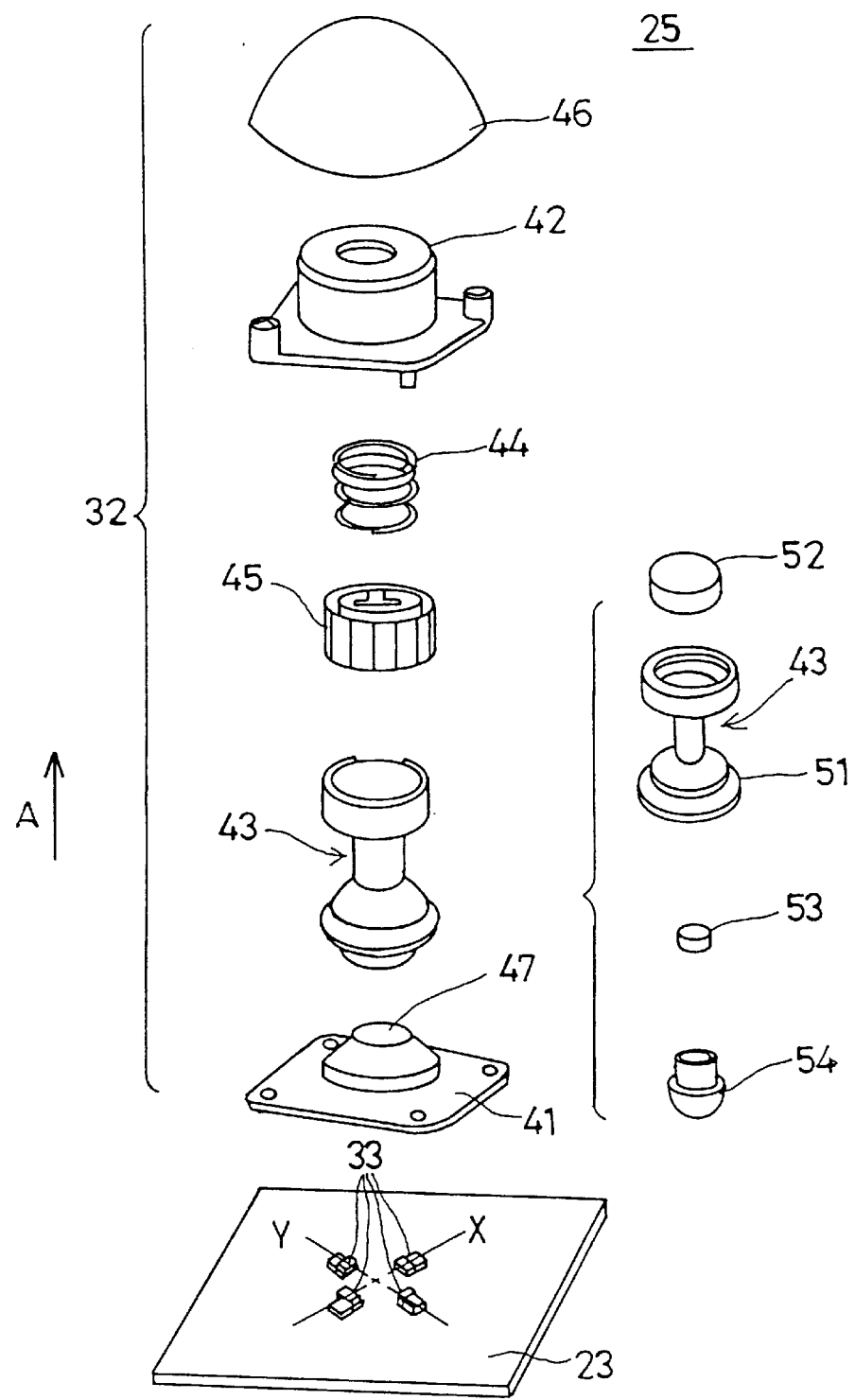
FIG. 3 is an exploded perspective view of a conventional acceleration sensor.
Figure 4A:
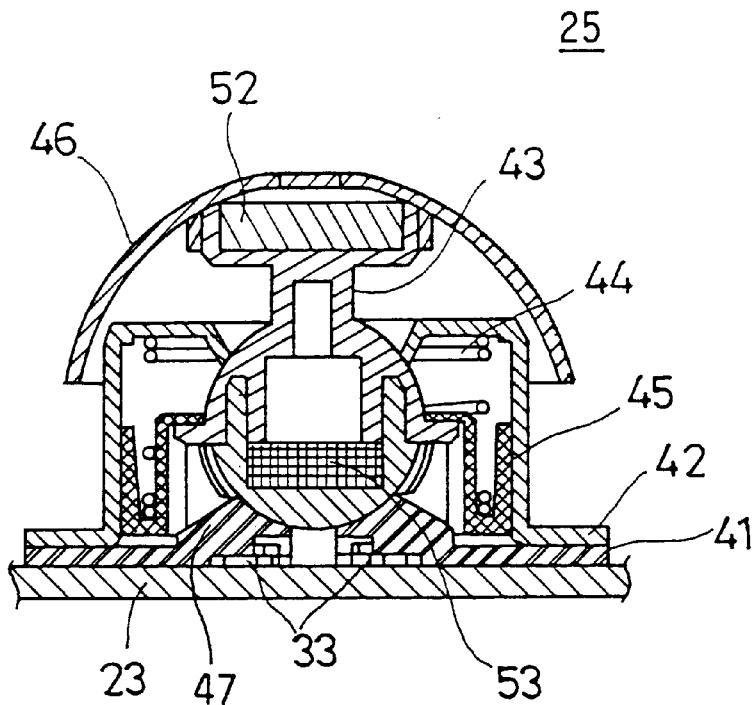
FIGS. 4A and 4B are diagrams for illustrating an operation of the conventional acceleration sensor.
Figure 4B:
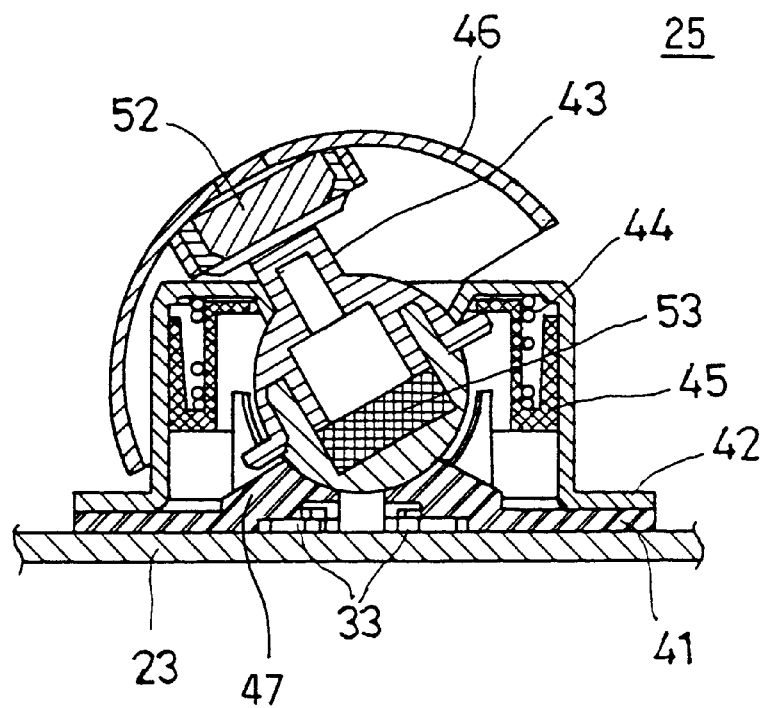
Figure 5:
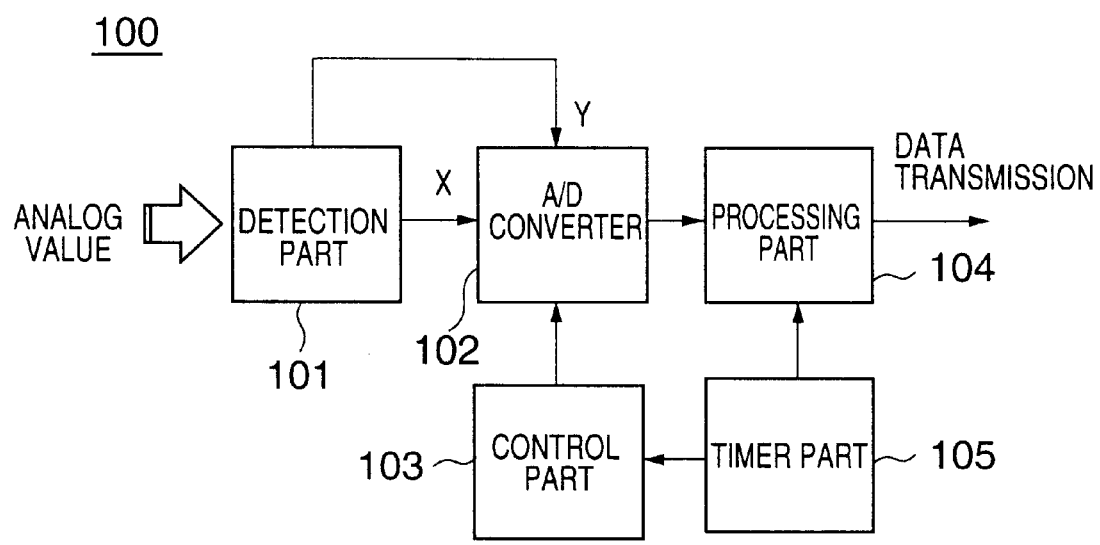
FIG. 5 is a block diagram of an acceleration detection device according to an embodiment of the present invention.

FIG. 5 is a block diagram of an acceleration detection device 100 according to the embodiment of the present invention.

The acceleration detection device 100 includes a detection part 101, an analog-to-digital (A/D) converter 102, a control part 103, a processing part 104, and a timer part 105.

The acceleration detection device 100 is connected to an acceleration sensor, which has the same structure as the above-described acceleration sensor 25.

The detection part 101 is connected to first and second pairs of Hall elements of the acceleration sensor, which pairs detect displacements of the lever of the acceleration sensor in the X-axis and Y-axis directions, respectively. The detection part 101 receives first and second analog detection signals (X and Y detection signals) from the first and second pairs of Hall elements, respectively, and supplies the first and second analog detection signals to the A/D converter 102.

The A/D converter 102 converts the first and second analog detection signals into first and second digital data. A conversion timing of the A/D converter 102 is controlled based on a clock signal supplied from the control part 103.

The control part 103 controls the conversion timing of the A/D converter 102 based on a clock signal supplied from the timer part 105. As will be described later, the processing part 104 detects the direction of acceleration from the first and second digital data supplied from the A/D converter 102 based on the clock signal supplied from the timer unit 105.

The processing part 104 houses memory including a ROM and a RAM. The ROM stores a program for detecting acceleration based on the data supplied from the A/D converter 102. The RAM serves as working storage in executing the program.

The timer part 105 supplies the predetermined clock signal to the control part 103 and the processing part 104.

Next, a detailed description will be given of a waveform recognition operation performed by the processing part 104.

The processing part 104 recognizes a direction in which an acceleration is applied based on changes in the waveforms of the X and Y detection signals.

The processing unit 104, for instance, recognizes an acceleration based on the waveform of the X and Y detection signals generated when a force is applied and when the applied force is stopped.

Figure 6:
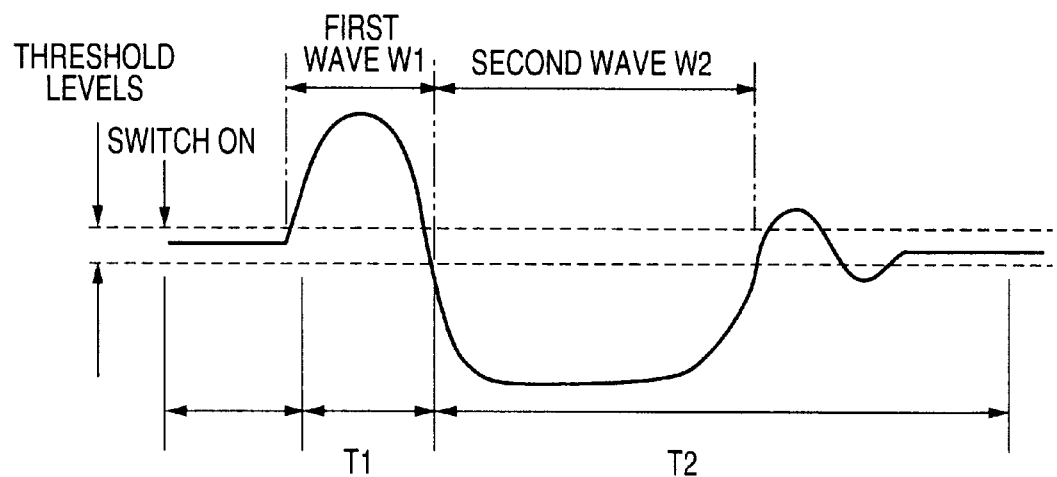
FIG. 6 is a diagram showing a waveform of a detection signal according to the embodiment of the present invention.

FIG. 6 is a diagram showing a waveform of one of such detection signals according to the embodiment of the present invention.

The detection signal includes first and second waves W1 and W2. The first wave W1 is a waveform generated when an acceleration is applied, and the second wave W2 is a waveform generated when the acceleration is stopped. If the acceleration is applied in a normal state, there is a certain relation between a time period T1 of the first wave W1 and a convergence time period T2 including the second wave W2.

The processing part 104 sets a plurality of threshold levels to detect this change in the waveform, and recognizes the acceleration.

Here, a description will be given of the threshold levels set in the processing part 104.

Figure 7:
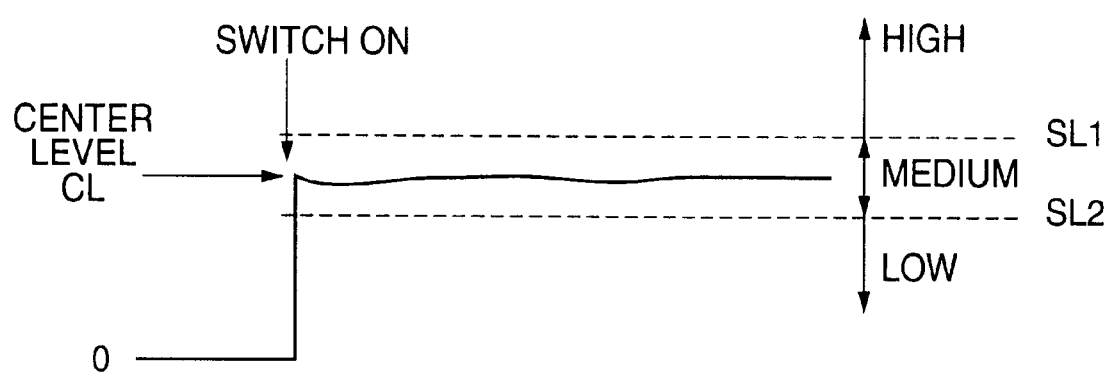
FIG. 7 is a diagram showing threshold levels according to the embodiment of the present invention.

FIG. 7 is a diagram showing the threshold levels according to the embodiment of the present invention.

As shown in FIG. 7, first and second threshold levels SL1 and SL2 are provided in the processing part 104 so that the first threshold level SL1 is higher than the second threshold level SL2 and a difference between the first threshold level SL1 and a center level CL is equal to that between the second threshold level SL2 and the center level CL. The center level CL is a bias level of a time when a power is turned on. The first threshold level SL1 is a threshold for detecting a HIGH level, and the second threshold level SL2 is a threshold for detecting a LOW level.

The processing part 104 determines that the level of the detection signal is HIGH if the level becomes higher than the first threshold level SL1, that the level of the detection signal is MEDIUM if the level falls in a range between the first and second threshold levels SL1 and SL2, and that the level of the detection signal is LOW if the level becomes lower than the second threshold level SL2. The processing part 104 recognizes the acceleration based on the above-described determination results.

The waveform recognition operation of the processing part 104 includes an input pattern matching operation, an input pattern correction operation, and an acceleration measurement operation.

The input pattern matching operation is an operation for determining whether an input pattern matches an acceleration pattern.

The processing part 104 monitors the X and Y detection signals. If the level of the X or Y detection signal becomes higher than the first threshold level SL1 or lower than the second threshold level SL2, the processing part 104 starts the input pattern matching operation. However, at this time, the levels of the X and Y detection signals are not detected at the same timing. Therefore, if one of the levels of the X and Y detection signals is MEDIUM when the input pattern matching operation is started on the other, the input pattern matching operation on the one of the levels of the X and Y detection signals is started when the one of the levels of the X and Y detection signals becomes higher than the first threshold level SL1 or lower than the second threshold level SL2 within a given time period. The level of the X or Y detection signal of a timing at which the input pattern matching operation is started is referred to as an initial level.

It is determined that the first wave W1 is determined when the level of the X or Y detection signal becomes LOW.

The input pattern correction operation includes a SHORT operation, a CANCEL operation, a NOISE operation, and a REVERSE operation.

First, a description will be given in detail of the SHORT operation.

The SHORT operation determines which of the X and Y detection signals is to be adopted based on the time period T1 of the first wave W1.

FIGS. 8A through 8C are diagrams for illustrating the SHORT operation according to the embodiment of the present invention.

If the time period T1 of the first wave W1 of the X detection signal is a time period T11 and the time period T1 of the first wave W1 of the Y detection signal is a time period T12 as shown in FIG. 8A, it is determined based on the ratio of the time period T11 to the time period T12 which of the X and Y detection signals is to be adopted. For instance, if the time period T12 is not longer than 50% of the time period T11, the Y detection signal is not to be adopted.

If the level of the Y detection signal changes from HIGH to MEDIUM, and again to HIGH as shown in FIG. 8B, an input pattern is determined with two HIGH-level time periods being combined into the time period T1 of the first wave W1.

Further, if the level of the Y detection signal changes from HIGH to LOW, and again to HIGH as shown in FIG. 8C, two HIGH-level time periods are not recognized as the time period T1 of the single first wave W1.

Next, a description will be given of the CANCEL operation.

The CANCEL operation cancels the level of the X or Y detection signal based on the ratio of a value of the peak level (a peak level value) of the X detection signal to a peak level value of the Y detection signal.

Figure 9A:
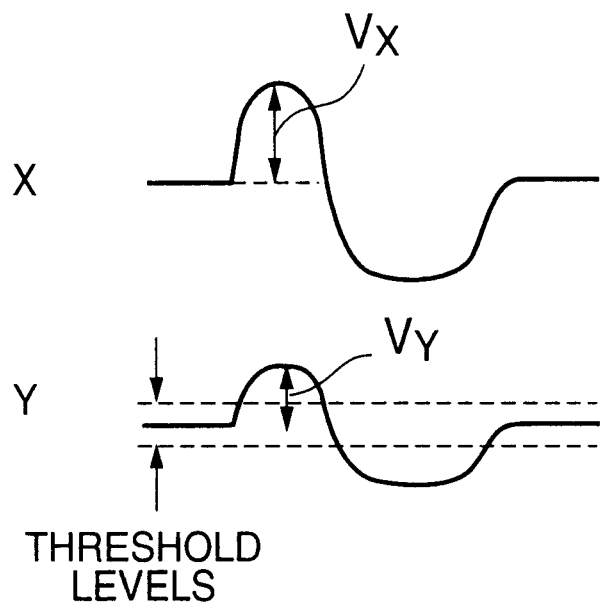
FIGS. 9A and 9B are diagrams for illustrating a CANCEL operation according to the embodiment of the present invention.
Figure 9B:
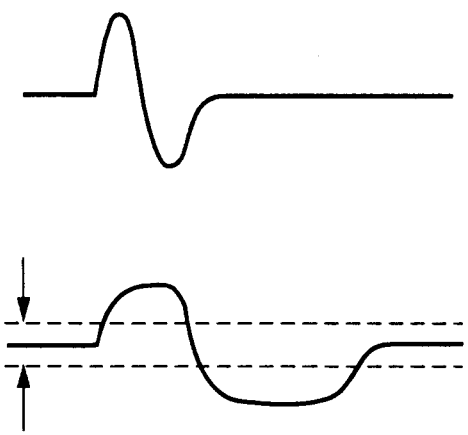

FIGS. 9A and 9B are diagrams for illustrating the CANCEL operation according to the embodiment of the present invention.

For instance, if the Y detection signal has a peak level value Vy smaller than a peak level value Vx of the X detection signal as shown in FIG. 9A, the level of the Y detection signal is determined to be MEDIUM.

However, if the X detection signal is to be subjected to the SHORT operation as shown in FIG. 9B, the peak level of the X detection signal is determined to be MEDIUM even if the peak level value Vy of the Y detection signal is smaller than the peak level value Vx of the X detection signal.

Next, a description will be given of the NOISE operation.

The NOISE operation detects the level of the X or Y detection signal as a noise.

FIGS. 10A through 10C are diagrams for illustrating the NOISE operation according to the embodiment of the present invention.

As shown in FIG. 10A, if the second wave W2 is not generated in the Y detection signal after a given time period, for instance, 100 ms, passes since the first wave W1 is detected, the first wave W1 of the Y detection signal is canceled and a level of the Y detection signal is determined to be MEDIUM.

However, if the X detection signal is to be subjected to the SHORT operation as shown in FIG. 10B, the SHORT operation is given priority and the Y detection signal is adopted.

Further, if the level of the X detection signal remains MEDIUM as shown in FIG. 10C, the first wave W1 of the Y detection signal is not canceled.

Next, a description will be given of the REVERSE operation.

The REVERSE operation substitutes the first wave W1 for the second wave W2 by reversing the polarity of the X or Y detection signal.

FIGS. 11A through 12B are diagrams for illustrating the REVERSE operation according to the embodiment of the present invention.

If the second wave W2 is not generated in the Y detection signal after a given time period, for instance, 100 ms, passes since the first wave W1 is detected as shown in FIG. 11A, the polarity of the Y detection signal is reversed so that the first wave W1 is set to the LOW level to be substituted for the second wave W2 with a new first wave W1 being set to the MEDIUM level.

If the second wave W2 is not generated in the X detection signal, either, after a given time period, for instance, 100 ms, passes since the first wave W1 is detected as shown in FIG. 11B, the polarity of the X detection signal is also reversed so that the first wave W1 is set to the HIGH level to be substituted for the second wave W2 with a new first wave W1 being set to the MEDIUM level.

If the waveform of the X detection signal satisfies the conditions as shown in FIG. 11C, the REVERSE operation is not performed on the Y detection signal.

Figures 12A, 12B:
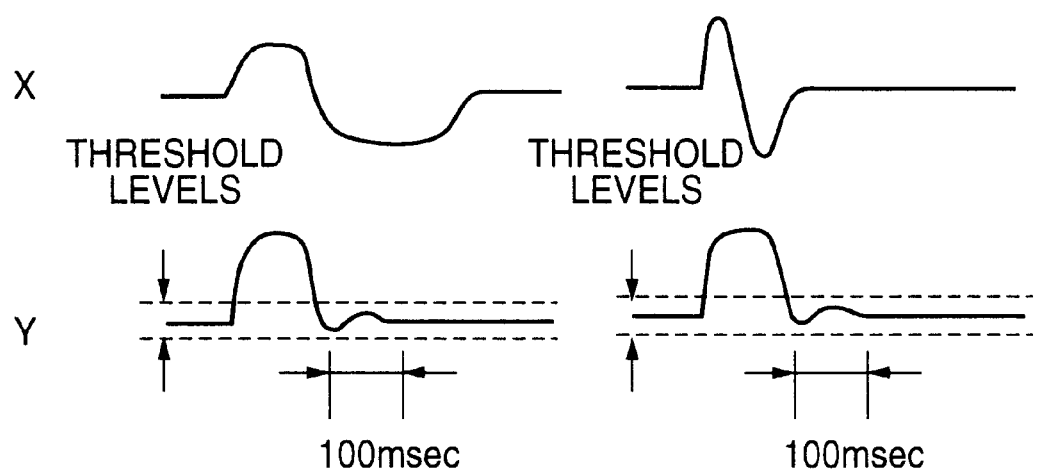
FIGS. 12A and 12B are other diagrams for illustrating the REVERSE operation according to the embodiment of the present invention.

If the X detection signal is to be subjected to the CANCEL operation as shown in FIG. 12A, the Y detection signal is adopted. However, at this time, since the first wave W1 is recognizable in the X detection signal, the REVERSE operation is not performed on the Y detection signal.

If the X detection signal is to be subjected to the SHORT operation as shown in FIG. 12B, the Y detection signal is adopted. However, since the first wave W1 is recognizable in the X detection signal, the REVERSE operation is not performed on the Y detection signal.

Next, a description will be given of the acceleration measurement operation.

The acceleration measurement operation is an operation for measuring acceleration.

First, a peak value Dpeek of the first wave W1 and a time period Tpeek from the start of the pattern matching operation until the peak value Dpeek is reached are measured. Then, the acceleration is obtained, for instance, by dividing the peak value Dpeek by the time period Tpeek (Dpeek/Tpeek). The acceleration may be obtained from a function of the peak value Dpeek and the time period Tpeek.

Next, a description will be given in detail of the waveform recognition operation of the processing part 104.

FIG. 13 is a flowchart of the waveform recognition operation according to the embodiment of the present invention.

The waveform recognition operation, which is performed on each of the X and Y detection signals, includes steps S1-1 through S1-12.

In step S1-1, it is determined whether the first wave W1 is already determined. If it is determined in step S1-1 that the first wave W1 is not determined, step S1-2 is performed next.

In step S1-2, it is determined whether the determination of the first wave W1 is in process. If it is determined in step S1-2 that the determination of the first wave W1 is not in process, the processing part 104 next performs step S1-3.

In step S1-3, the initial level of the X or Y detection signal is provided. A detailed description of step S1-3 will be given later with reference to the accompanying drawing.

If it is determined in step S1-2 that the determination of the first wave W1 is in process, the processing part 104 next performs step S1-4. In step S1-4, the first wave W1 is determined. A detailed description of step S1-4 will be given later with reference to the accompanying drawing.

In step S1-5, it is determined whether the first wave W1 is determined in step S1-4. If it is determined in step S1-5 that the first wave W1 is determined in step S1-5, the processing part 104 next performs step S1-6. In step S1-6, the CANCEL operation is performed. A detailed description of the CANCEL operation of step S1-6 will be given later with reference to the accompanying drawing.

If it is determined in step S1-1 that the first wave W1 is already determined, the processing part 104 performs step S1-7. In step S1-7, it is determined whether the second wave W2 is already determined.

If it is determined in step S1-7 that the second wave W2 is not determined, the processing part 104 performs step S1-8. In step S1-8, a second wave waiting operation is performed. A detailed description of step S1-8 will be given later with reference to the accompanying drawing. In step S1-9, a flag register for pattern determination is initialized.

If it is determined in step S1-7 that the second wave W2 is already determined, step S1-10 is performed. In step S1-10, a voltage stability waiting operation is performed to wait for a voltage to fall within a given range.

In step S1-11, it is determined whether the voltage is stabilized. If it is determined in step S1-11 that the voltage is stabilized, the processing part 104 performs step S1-12. In step S1-12, a pattern setting operation is performed to determine a detected pattern in which the first and second waves W1 and W2 are determined.

The processing part 104 repeats the above-described steps S1-1 through S1-12 so that an acceleration and its direction are detected.

Next, a description will be given in detail of an initial level setting operation of step S1-3.

Figure 14:
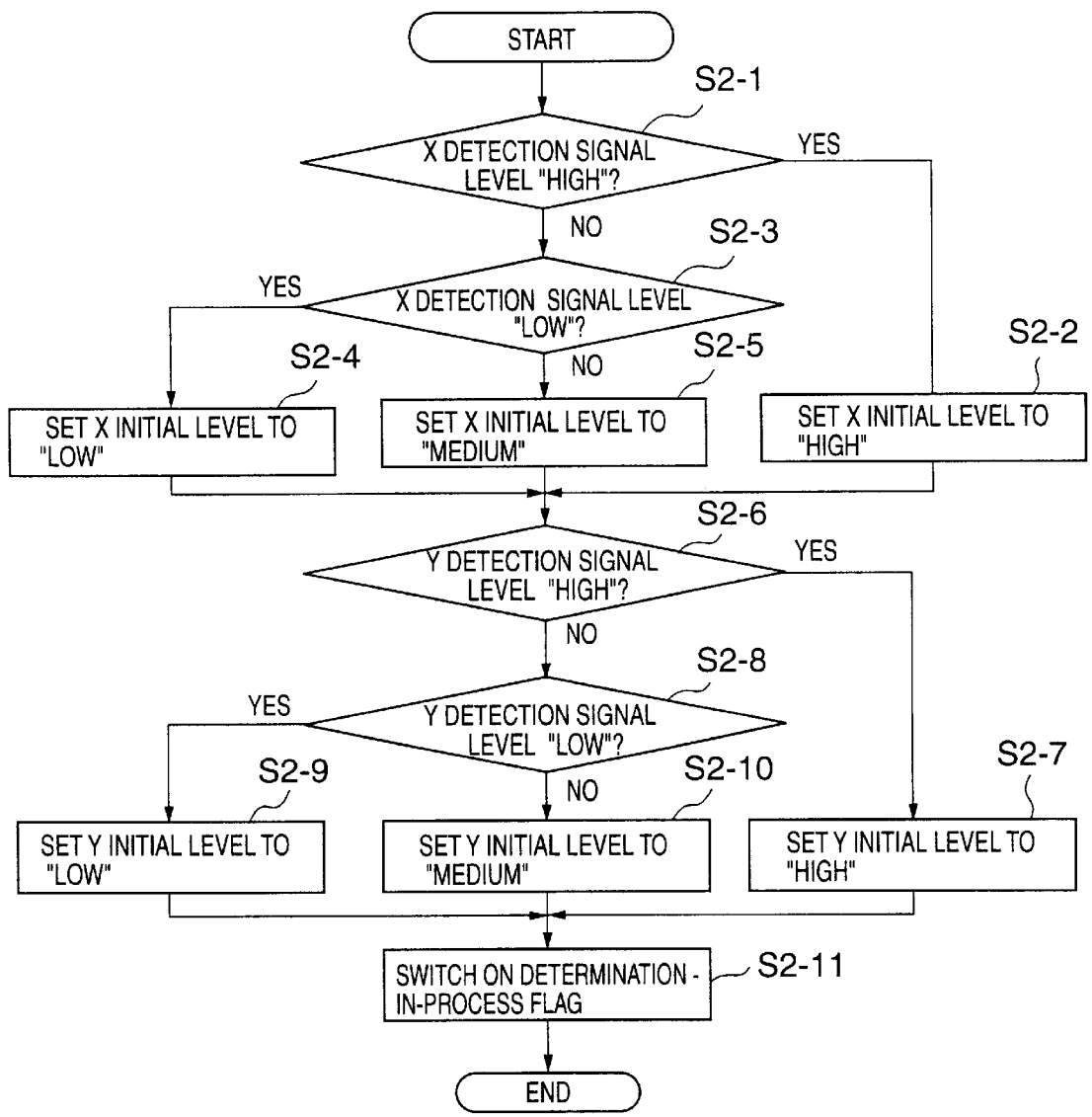
FIG. 14 is a flowchart of an initial level setting operation according to the embodiment of the present invention.

FIG. 14 is a flowchart of the initial level setting operation according to the embodiment of the present invention.

The initial level setting operation includes step S2-1 through S2-11. The initial level of the X detection signal (X initial level) is set through step S2-1 through S2-5 and that of the Y detection signal (Y initial level) is set through step S2-6 through S2-10.

In step S2-1, it is determined whether the level of the X detection signal is HIGH. If it is determined in step S2-1 that the level of the X detection signal is HIGH, the processing part 104 performs step S2-2. In step S2-2, the X initial level is set to HIGH.

If it is determined in step S2-1 that the level of the X detection signal is not HIGH, the processing part 104 next performs step S2-3. In step S2-3, it is determined whether the level of the X detection signal is LOW.

If it is determined in step S2-3 that the level of the X detection signal is LOW, the processing part 104 performs step S2-4. In step S2-4, the X initial level is set to LOW.

If it is determined in step S2-3 that the level of the X detection signal is LOW, the processing part 104 performs step S2-5. In step S2-5, the X initial level is set to MEDIUM.

The processing part 104 determines that the level of the X detection signal is HIGH if the level of the X detection signal becomes higher than the first threshold level SL1 and that the level of the X detection signal is LOW if the level of the X detection signal becomes lower than the second threshold level SL2.

In step S2-6, it is determined whether the level of the Y detection signal is HIGH. If it is determined in step S2-6 that the level of the Y detection signal is HIGH, the processing part 104 performs step S2-7. In step S2-7, the Y initial level is set to HIGH.

If it is determined in step S2-6 that the level of the Y detection signal is not HIGH, the processing part 104 next performs step S2-8. In step S2-8, it is determined whether the level of the Y detection signal is LOW.

If it is determined in step S2-8 that the level of the Y detection signal is LOW, the processing part 104 performs step S2-9. In step S29, the Y initial level is set to LOW.

If it is determined in step S2-8 that the level of the Y detection signal is not LOW, the processing part 104 performs step S2-10. In step S2-10, the Y initial level is set to MEDIUM.

If the X and Y initial levels are set through the above-described steps, in step S2-11, a determination-in-process flag is switched ON.

The processing part 104 determines that the level of the Y detection signal is HIGH if the level of the Y detection signal becomes higher than the first threshold level SL1 and that the level of the Y detection signal is LOW if the level of the Y detection signal becomes lower than the second threshold level SL2.

Through the above-described steps, the initial levels of the input waveforms of the X and Y detection signals are determined.

Next, a description will be given in detail of a first wave determination operation of step S1-4.

Figure 15:
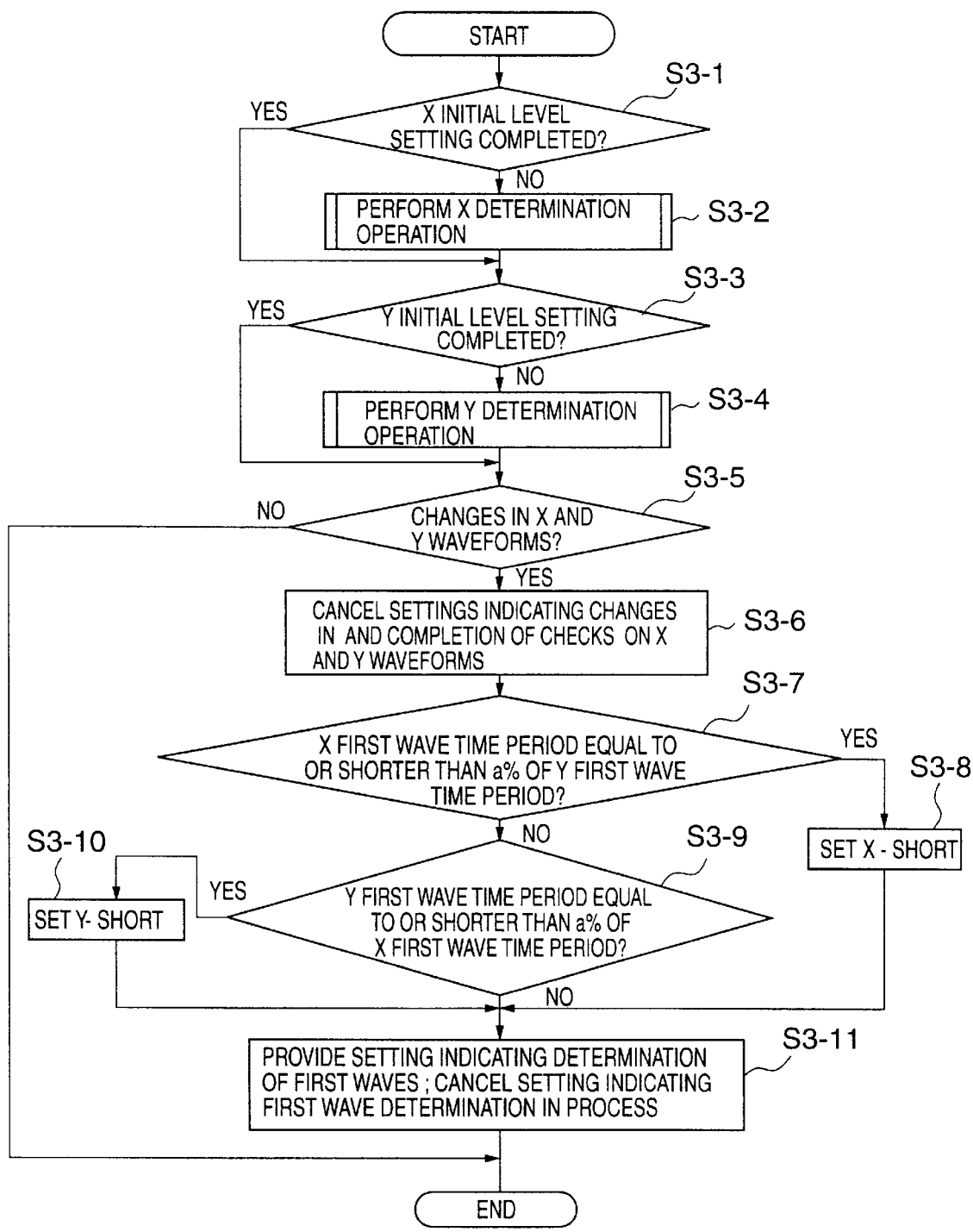
FIG. 15 is a flowchart of a first wave determination operation according to the embodiment of the present invention.

FIG. 15 is a flowchart of the first wave determination operation according to the embodiment of the present invention.

The first wave determination operation includes steps S3-1 through S3-11.

In step S3-1, it is determined whether the setting of the X initial level is completed. If it is determined in step S3-1 that the setting of the X initial level is completed, the processing part 104 performs step S3-2. In step S3-2, a state determination operation on the X detection signal (X determination operation) is performed. A detailed description of the X determination operation will be given later with reference to the accompanying drawing.

If it is determined in step S3-2 that the X determination operation is completed, the processing part 104 performs step S3-3. In step S3-3, it is determined whether the setting of the Y initial level is completed. If it is determined in step S3-3 that the setting of the Y initial level is completed, the processing part 104 performs step S3-4. In step S3-4, a state determination operation on the Y detection signal (Y determination operation) is performed. A detailed description of the Y determination operation will be given later with reference to the accompanying drawing.

In step S3-5, it is determined based on the results of steps S3-2 and S3-4 whether there is a change in the waveform of each of the X and Y detection signals. If it is determined in step S3-5 that there is a change in the waveform of each of the X and Y detection signals, the processing part 104 performs step S3-6. In step S3-6, settings indicating changes in the waveforms of the X and Y detection signals, respectively, and settings indicating completion of checks on the waveforms of the X and Y detection signals, respectively, are canceled.

In step S3-7, it is determined based on a comparison between the time periods T1 of the first waves W1 of the X and Y detection signals whether the time period T1 of the first wave W1 of the X detection signal is equal to or shorter than $\underline{a}$% of the time period T1 of the first wave W1 of the Y detection signal. The value $\underline{a}$ is predetermined and is empirically obtained. If it is determined in step S3-7 that the time period T1 of the first wave W1 of the X detection signal is equal to or shorter than $\underline{a}$% of the time period T1 of the first wave W1 of the Y detection signal, the processing part 104 performs step S3-8. In step S3-8, a setting indicating that the SHORT operation is performed on the X detection signal (X-SHORT) is provided.

If it is determined in step S3-7 that the time period T1 of the first wave W1 of the X detection signal is longer than $\underline{a}$% of the time period T1 of the first wave W1 of the Y detection signal, the processing part 104 performs step S3-9. In step S3-9, it is determined based on a comparison between the time periods T1 of the first waves W1 of the X and Y detection signals whether the time period T1 of the first wave W1 of the Y detection signal is equal to or shorter than $\underline{a}$% of the time period T1 of the first wave W1 of the X detection signal.

If it is determined in step S3-9 that the time period T1 of the first wave W1 of the Y detection signal is equal to or shorter than $\underline{a}$% of the time period T1 of the first wave W1 of the X detection signal, the processing part 104 performs step S3-10. In step S3-10, a setting indicating that the SHORT operation is performed on the Y detection signal (Y-SHORT) is provided.

In step S3-11, a setting indicating the determination of the first waves W1 is provided, and a setting indicating that a first-wave determination is in process is canceled.

Thus, the first wave W1 of each of the X and Y detection signals is determined.

Next, a description will be given of the X determination operation of step S3-2.

Figure 16:
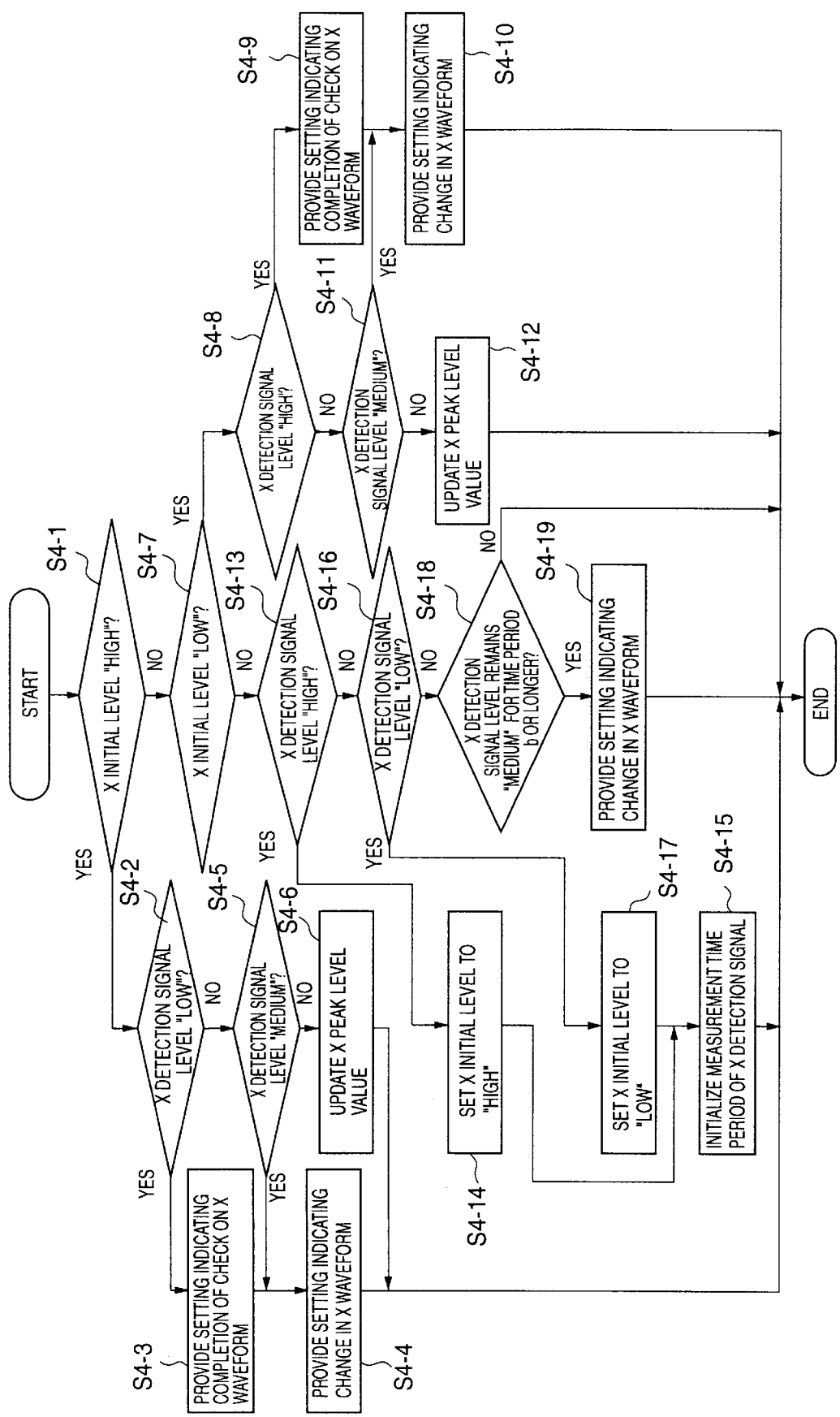
FIG. 16 is a flowchart of an X determination operation according to the embodiment of the present invention.

FIG. 16 is a flowchart of the X determination operation according to the embodiment of the present invention.

The X determination operation includes steps S4-1 through S4-19.

In step S4-1, it is determined whether the X initial level is HIGH. If it is determined in step S4-1 that the X initial level is HIGH, the processing part 104 performs step S4-2. In step S4-2, it is determined whether the level of the X detection signal is LOW.

If it is determined in step S4-2 that the level of the X detection signal is LOW, the processing part 104 performs steps S4-3 and S4-4. In step S4-3, the setting indicating completion of a check on the waveform of the X detection signal is provided. In step S4-4, the setting indicating a change in the waveform of the X detection signal is provided.

If it is determined in step S4-2 that the level of the X detection signal is not LOW, the processing part 104 performs step S4-5. In step S4-5, it is determined whether the level of the X detection signal is MEDIUM.

If it is determined in step S4-5 that the level of the X detection signal is MEDIUM, the processing part 104 performs step S4-4. If it is determined in step S4-5 that the level of the X detection signal is not MEDIUM, that is, that the level of the X detection signal has a HIGH-level value, the processing part 104 performs step S4-6. In step S4-6, the peak level value of the X detection signal is replaced by the HIGH-level value thereof.

If it is determined in step S4-1 that the X initial level is not HIGH, the processing part 104 performs step S4-7. In step S4-7, it is determined whether the X initial level is LOW.

If it is determined in step S4-7 that the X initial level is LOW, the processing part 104 performs step S4-8. In step S4-8, it is determined whether the level of the X detection signal is HIGH.

If it is determined in step S4-8 that the level of the X detection signal is HIGH, the processing part 104 performs steps S4-9 and S4-10. In step S4-9, the setting indicating completion of a check on the waveform of the X detection signal is provided. In step S4-10, the setting indicating a change in the waveform of the X detection signal is provided.

If it is determined in step S4-8 that the level of the X detection signal is not HIGH, the processing part 104 performs S4-11. In step S4-11, it is determined whether the level of the X detection signal is MEDIUM.

If it is determined in step S4-11 that the level of the X detection signal is MEDIUM, the processing part 104 performs step S4-10. If it is determined in step S4-11 that the level of the X detection signal is not MEDIUM, that is, that the level of the X detection signal has a LOW-level value, the processing part 104 performs step S4-12. In step S4-12, the peak level value of the X detection signal is replaced by the LOW-level value.

If it is determined in step S4-7 that the X initial level is not LOW, the processing part 104 performs step S4-13. In step S4-13, it is determined whether the level of the X detection signal is HIGH.

If it is determined in step S4-13 that the level of the X detection signal is HIGH, the processing part 104 performs steps S4-14 and S4-15. In step S4-14, the X initial level is set to HIGH. In step S4-15, a measurement time period of the X detection signal is initialized.

If it is determined in step S4-13 that the level of the X detection signal is not HIGH, the processing part 104 performs step S4-16. In step S4-16, it is determined whether the level of the X detection signal is LOW.

If it is determined in step S4-16 that the level of the X detection signal is LOW, the processing part 104 performs steps S4-17 and S4-15. In step S4-17, the X initial level is set to LOW.

If it is determined in step S4-16 that the level of the X detection signal is not LOW, the processing part 104 performs step S4-18. In step S4-18, it is determined whether the level of the X detection signal remains MEDIUM for a time period b or longer. The time period b is predetermined and is empirically obtained based on a characteristic of an input mechanism.

If it is determined in step S4-18 that the level of the X detection signal remains MEDIUM for the time period b or longer, the processing part 104 performs step S4-19. In step S4-19, the setting indicating that there is a change in the waveform of the X detection signal. If it is determined in step S4-18 that the level of the X detection signal does not remain MEDIUM for the time period b or longer, the processing part 104 stops the operation.

Thus, the state of the X detection signal is determined.

Next, a description will be given of the Y determination operation of step S3-4.

Figure 17:
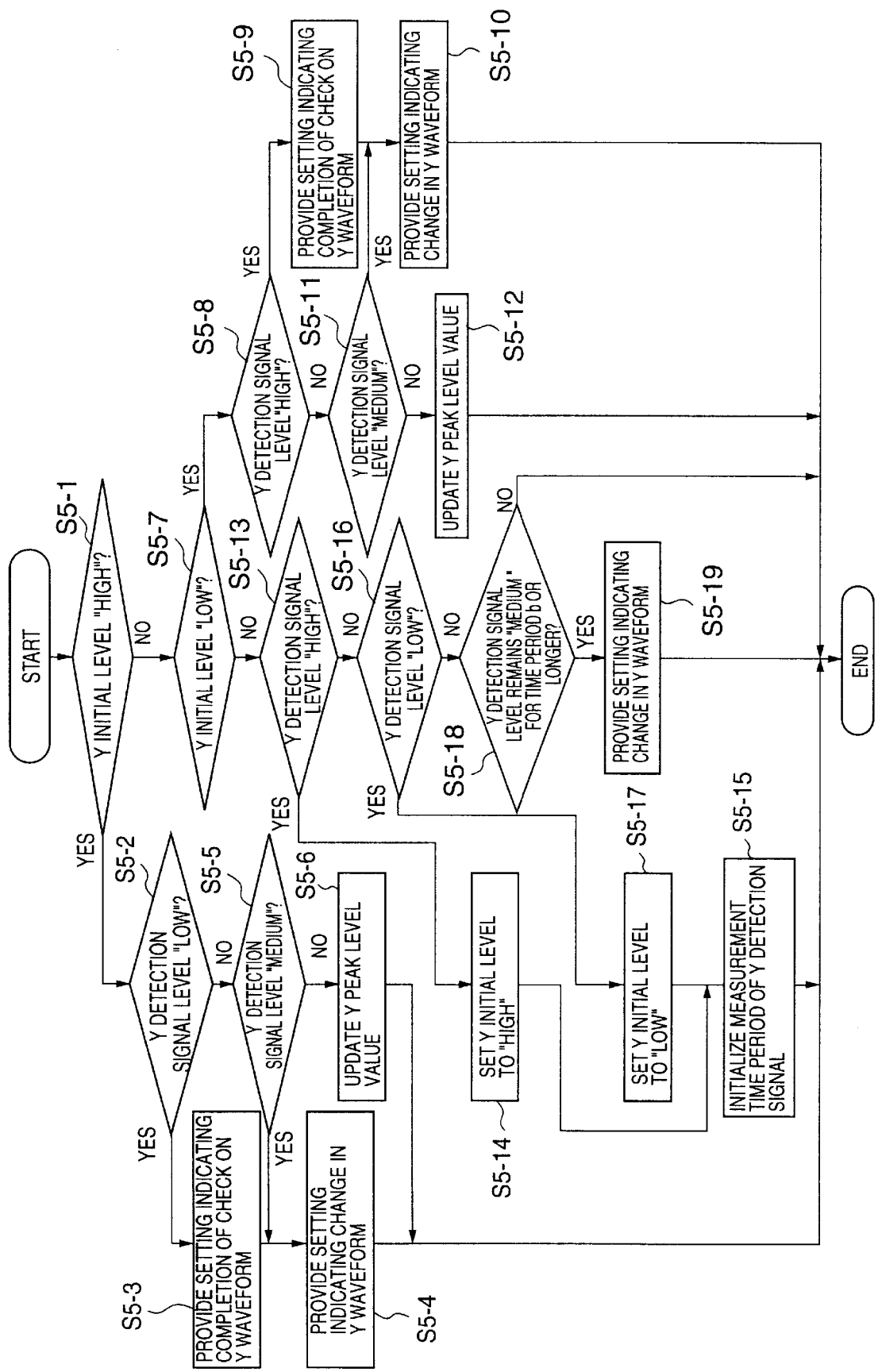
FIG. 17 is a flowchart of a Y determination operation according to the embodiment of the present invention.

FIG. 17 is a flowchart of the Y determination operation according to the embodiment of the present invention.

The Y determination operation includes steps S5-1 through S5-19.

In step S5-1, it is determined whether the Y initial level is HIGH. If it is determined in step S5-1 that the Y initial level is HIGH, the processing part 104 performs step S5-2. In step S5-2, it is determined whether the level of the Y detection signal is LOW.

If it is determined in step S5-2 that the level of the Y detection signal is LOW, the processing part 104 performs steps S5-3 and S5-4. In step S5-3, the setting indicating completion of a check on the waveform of the Y detection signal is provided. In step S5-4, the setting indicating a change in the waveform of the Y detection signal is provided.

If it is determined in step S5-2 that the level of the Y detection signal is not LOW, the processing part 104 performs step S5-5. In step S5-5, it is determined whether the level of the Y detection signal is MEDIUM.

If it is determined in step S5-5 that the level of the Y detection signal is MEDIUM, the processing part 104 performs step S5-4. If it is determined in step S5-5 that the level of the Y detection signal is not MEDIUM, that is, that the level of the Y detection signal has a HIGH-level value, the processing part 104 performs step S5-6. In step S5-6, the peak level value of the Y detection signal is replaced by the HIGH-level value thereof.

If it is determined in step S5-1 that the Y initial level is not HIGH, the processing part 104 performs step S5-7. In step S5-7, it is determined whether the Y initial level is LOW.

If it is determined in step S5-7 that the Y initial level is LOW, the processing part 104 performs step S5-8. In step S5-8, it is determined whether the level of the Y detection signal is HIGH.

If it is determined in step S5-8 that the level of the Y detection signal is HIGH, the processing part 104 performs steps S5-9 and S5-10. In step S5-9, the setting indicating completion of a check on the waveform of the Y detection signal is provided. In step S5-10, the setting indicating a change in the waveform of the Y detection signal is provided.

If it is determined in step S5-8 that the level of the Y detection signal is not HIGH, the processing part 104 performs S5-11. In step S5-11, it is determined whether the level of the Y detection signal is MEDIUM.

If it is determined in step S5-11 that the level of the Y detection signal is MEDIUM, the processing part 104 performs step S5-10. If it is determined in step S5-11 that the level of the Y detection signal is not MEDIUM, that is, that the level of the Y detection signal has a LOW-level value, the processing part 104 performs step S5-12. In step S5-12, the peak level value of the Y detection signal is replaced by the LOW-level value.

If it is determined in step S5-7 that the Y initial level is not LOW, the processing part 104 performs step S5-13. In step S5-13, it is determined whether the level of the Y detection signal is HIGH.

If it is determined in step S5-13 that the level of the Y detection signal is HIGH, the processing part 104 performs steps S5-14 and S5-15. In step S5-14, the Y initial level is set to HIGH. In step S5-15, a measurement time period of the Y detection signal is initialized.

If it is determined in step S5-13 that the level of the Y detection signal is not HIGH, the processing part 104 performs step S5-16. In step S5-16, it is determined whether the level of the Y detection signal is LOW.

If it is determined in step S5-16 that the level of the Y detection signal is LOW, the processing part 104 performs steps S5-17 and S5-15. In step S5-17, the Y initial level is set to LOW.

If it is determined in step S5-16 that the level of the Y detection signal is not LOW, the processing part 104 performs step S5-18. In step S5-18, it is determined whether the level of the Y detection signal remains MEDIUM for the time period b or longer. The time period b is predetermined and is empirically obtained based on a characteristic of an input mechanism.

If it is determined in step S5-18 that the level of the Y detection signal remains MEDIUM for a time period b or longer, the processing part 104 performs step S5-19. In step S5-19, the setting indicating that there is a change in the waveform of the Y detection signal. If it is determined in step S5-18 that the level of the Y detection signal does not remain MEDIUM for a time period b or longer, the processing part 104 stops the operation.

Thus, the state of the Y detection signal is determined.

Next, a description will be given in detail of the CANCEL operation of step S1-6.

Figure 18:
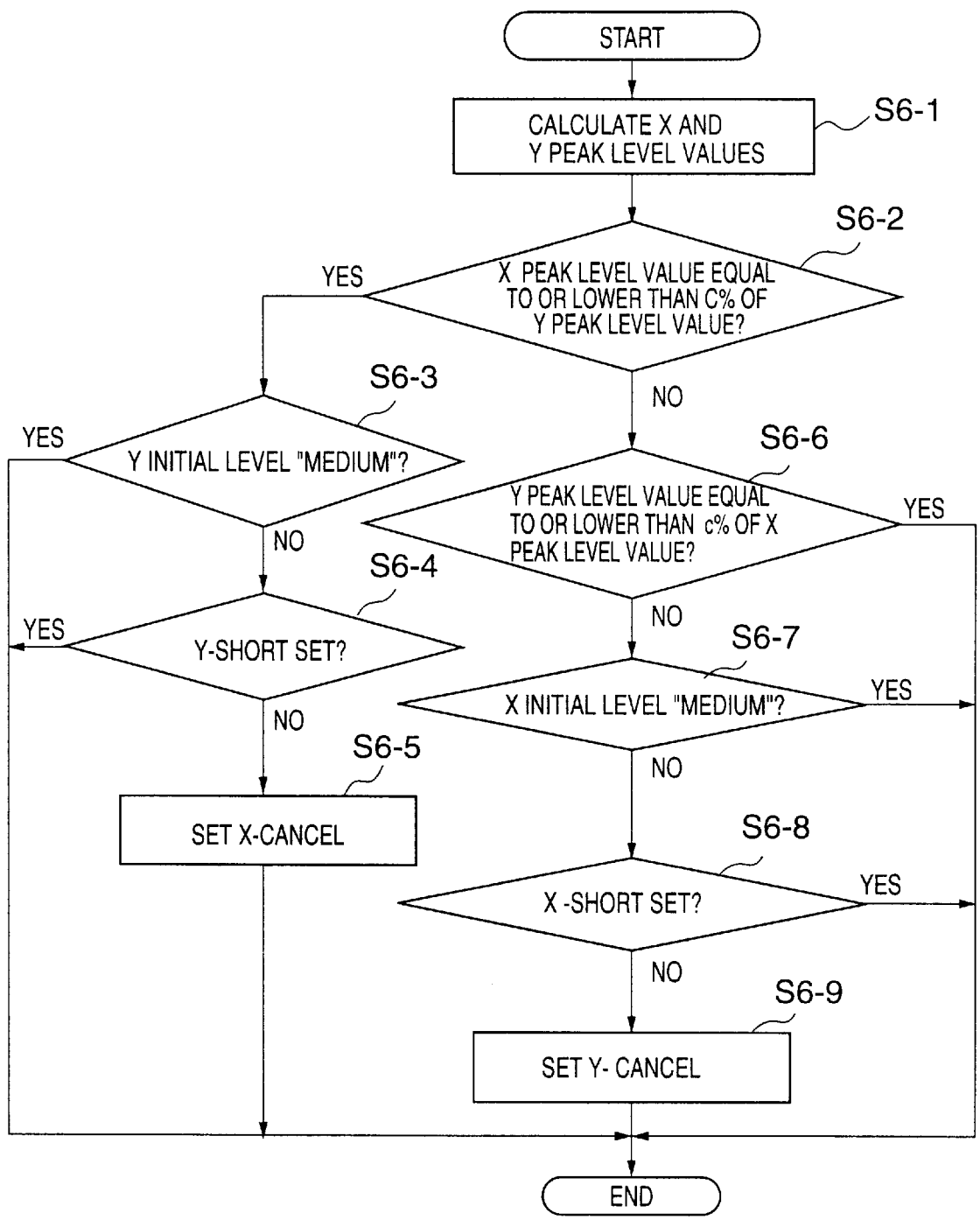
FIG. 18 is a flowchart of the CANCEL operation according to the embodiment of the present invention.

FIG. 18 is a flowchart of the CANCEL operation according to the embodiment of the present invention.

The CANCEL operation includes steps S6-1 through S6-9.

In step S6-1, the peak level values of the X and Y detection signals are calculated. The peak level value is expressed by the amount of displacement from the center value. In step S6-2, it is determined based on a comparison between the peak level value of the X detection signal (X peak level value) and the peak level value of the Y detection signal (Y peak level value) whether the X peak level value is equal to or lower than c % of the Y peak level value. The value c is a predetermined value preset in the processing part 104 and is empirically obtained.

If it is determined in step S6-2 that the X peak level value is equal to or lower than c % of the Y peak level value, the processing part 104 next performs step S6-3. In step S6-3, it is determined whether the Y initial level is MEDIUM.

If it is determined in step S6-3 that the Y initial level is MEDIUM, the processing part 4 ends the operation. If it is determined in step S6-3 that the Y initial level is not MEDIUM, the processing part 104 performs step S6-4. In step S6-4, it is determined whether the setting indicating that the SHORT operation is performed on the Y detection signal (Y-SHORT) is provided. Y-SHORT is set in step S3-10.

If it is determined in step S6-4 that Y-SHORT is set, the processing part 104 ends the operation. If it is determined in step S6-4 that Y-SHORT is not set, the processing part 104 performs step S6-5. In step S6-5, a setting indicating that the CANCEL operation is performed on the X detection signal (X-CANCEL) is provided.

If it is determined in step S6-2 that the X peak level value is higher than c % of the Y peak level value, the processing part 104 next performs step S6-6. In step S6-6, it is determined based on a comparison between the X and Y peak level values whether the Y peak level value is equal to or lower than c % of the X peak level value.

If it is determined in step S6-6 that the Y peak level value is equal to or lower than c % of the X peak level value, the processing part 104 ends the operation. If it is determined in step S6-6 that the Y peak level value is greater than c % of the X peak level value, the processing part 104 performs step S6-7. In step S6-7, it is determined whether the X initial level is MEDIUM.

If it is determined in step S6-7 that the X initial level is MEDIUM, the processing part 104 ends the operation. If it is determined in step S6-7 that the X initial level is not MEDIUM, the processing part 104 performs step S6-8. In step S6-8, it is determined whether the setting indicating the SHORT operation is performed on the X detection signal (X-SHORT) is provided. X-SHORT is set in step S3-8.

If it is determined in step S6-8 that X-SHORT is set, the processing part 104 ends the operation. If it is determined in step S6-8 that X-SHORT is not set, the processing part 104 performs step S6-9. In step S6-9, a setting indicating that the CANCEL operation is performed on the Y detection signal (Y-CANCEL) is provided.

Thus, X-CANCEL and Y-CANCEL are set.

Next, a description will be given in detail of the second wave waiting operation of step S1-8.

Figure 19:
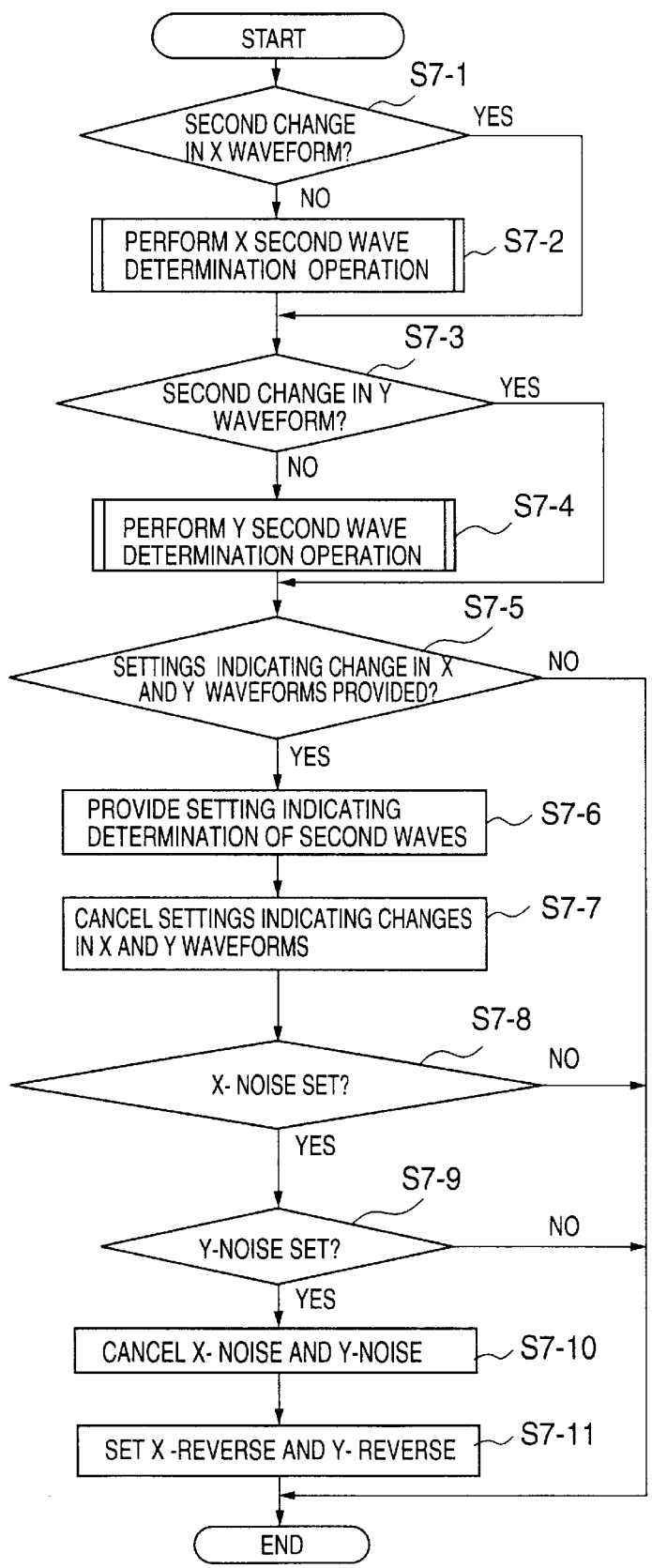
FIG. 19 is a flowchart of a second wave waiting operation according to the embodiment of the present invention.

FIG. 19 is a flowchart of the second wave waiting operation according to the embodiment of the present invention.

The second wave waiting operation includes steps S7-1 through S7-11.

In step S7-1, it is determined whether there is another (second) change in the waveform of the X detection signal. If it is determined in step S7-1 that there is a second change in the waveform of the X detection signal, the processing part 104 performs step S7-3. If it is determined in step S7-1 that there is not a second change in the waveform of the X detection signal, the processing part 104 performs step S7-2 before step S7-3.

In step S7-2, an X second wave determination operation is performed to determine whether the second wave W2 is generated in the X detection signal. A detailed description of the X second wave determination operation will be given later with reference to the accompanying drawing.

In step S7-3, it is determined whether there is another (second) change in the waveform of the Y detection signal. If it is determined in step S7-3 that there is a second change in waveform of the Y detection signal, the processing part 104 performs step S7-5. If it is determined in step S7-3 that there is not a second change in waveform of the Y detection signal, the processing part 104 performs step S7-4 before step S7-5. In step S7-4, a Y second wave determination operation is performed to determine whether the second wave W2 is generated in the Y detection signal. A detailed description of the Y second wave determination operation will be given later with reference to the accompanying drawing.

In step S7-5, it is determined whether the settings indicating changes in the waveforms of the X and Y detection signals are provided. The setting indicating a change in the waveform of the X detection signal is provided in later-described step S8-2, and the setting indicating a change in the waveform of the Y detection signal is provided in later-described step S9-2.

If it is determined in step S7-5 that the settings indicating changes in the waveforms of the X and Y detection signals are not provided, the processing part 104 ends the operation. If it is determined in step S7-5 that the settings indicating changes in the waveforms of the X and Y detection signals are provided, the processing part 104 successively performs steps S7-6 and S7-7. In step S7-6, a setting indicating the determination of the second waves W2 is provided. In step S7-7, the settings indicating changes in the waveforms of the X and Y detection signals are canceled.

In step S7-8, it is determined whether a setting indicating that the NOISE operation is performed on the X detection signal (X-NOISE) is provided. If it is determined in step S7-8 that X-NOISE is not set, the processing part 104 continues the operation. If it is determined in step S7-8 that X-NOISE is set, the processing part 104 performs step S7-9.

In step S7-9, it is determined whether a setting indicating that the NOISE operation is performed on the Y detection signal (Y-NOISE) is provided. If it is determined in step S7-9 that Y-NOISE is not set, the processing part 104 continues the operation. If it is determined in step S7-9 that Y-NOISE is set, the processing part 104 performs steps S7-10 and S7-11.

In step S7-10, X-NOISE and Y-NOISE are canceled. In step S7-11, settings for awaiting the REVERSE operations on the X and Y detection signals, respectively, (X-REVERSE and Y-REVERSE) are provided.

Next, a description will be given in detail of the X second wave determination operation of step S7-2.

Figure 20:
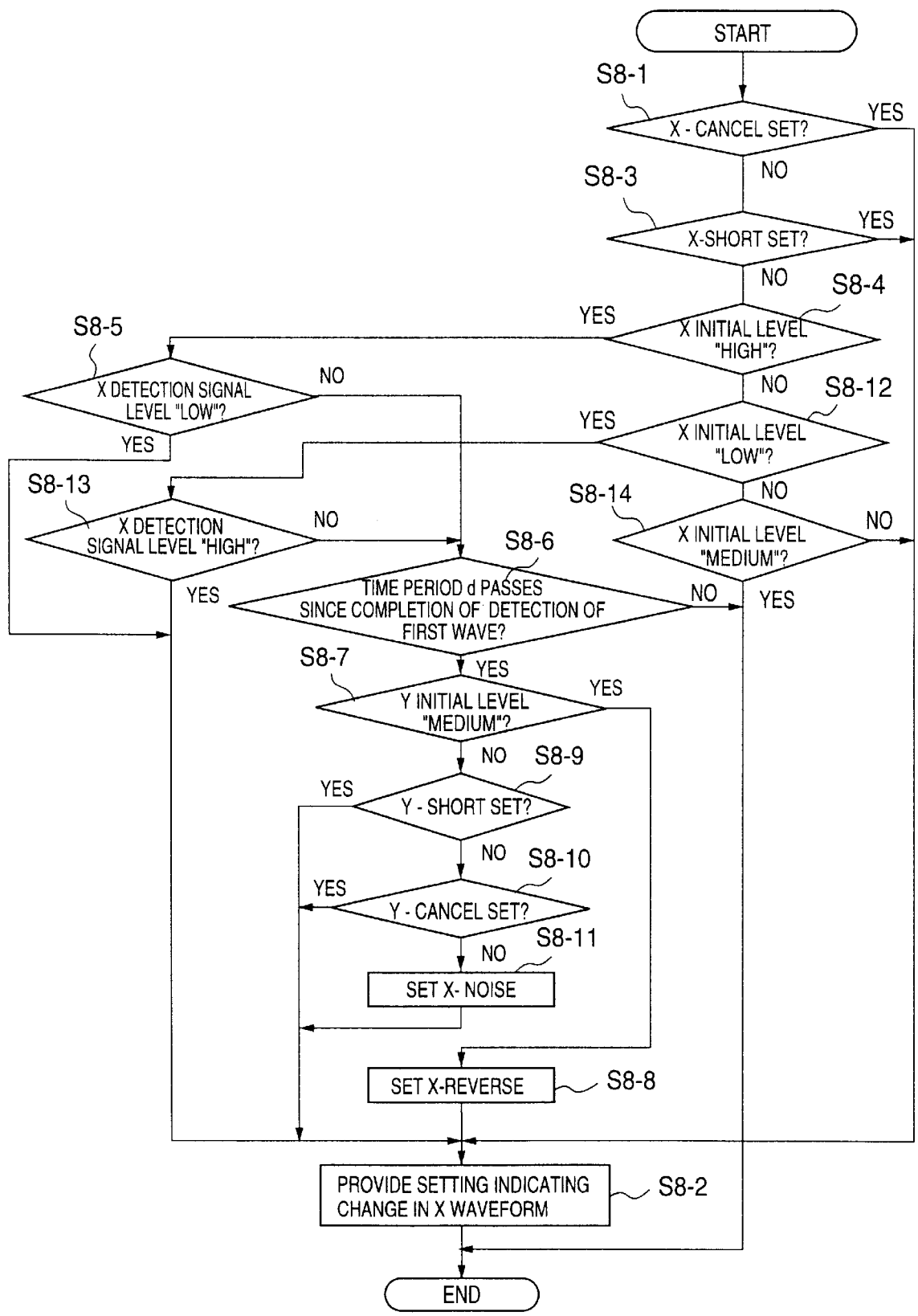
FIG. 20 is a flowchart of an X second wave determination operation according to the embodiment of the present invention.

FIG. 20 is a flowchart of the X second wave determination operation according to the embodiment of the present invention.

The X second wave determination operation includes steps S8-1 through S8-14.

In step S8-1, it is determined whether X-CANCEL is set. If it is determined in step S8-1 that the X-CANCEL is set, the processing part 104 performs step S8-2 and ends the operation. In step S8-2, the setting indicating a change in the waveform of the X detection signal is provided.

If it is determined in step S8-1 that X-CANCEL is not set, the processing part 104 performs step S8-3. In step S8-3, it is determined whether X-SHORT is set.

If it is determined in step S8-3 that X-SHORT is set, the processing part 104 performs step S8-2 and ends the operation. If it is determined in step S8-3 that the X-SHORT is not set, the processing part 104 performs step S8-4. In step S8-4, it is determined whether the X initial level is HIGH.

If it is determined in step S8-4 that the X initial level is HIGH, the processing part 104 performs step S8-5. In step S8-5, it is determined whether the level of the X detection signal is LOW.

If it is determined in step S8-5 that the level of the X detection signal is LOW, the processing part 104 performs step S8-2 and ends the operation. If it is determined in step S8-5 that the level of the X detection signal is not LOW, the processing part 104 performs step S8-6. In step S8-6, it is determined whether a time period d passes since the detection of the first wave W1 is completed. The time period d, which is predetermined and preset in the processing part 104, is empirically obtained.

If it is determined in step S8-6 that the time period d does not pass since the detection of the first wave W1 is completed, the processing part 104 ends the operation. If it is determined in step S8-6 that the time period d passes since the detection of the first wave W1 is completed, the processing part 104 performs step S8-7. In step S8-7, it is determined whether the level of the Y detection signal is MEDIUM.

If it is determined in step S8-7 that the level of the Y detection signal is MEDIUM, the processing part 104 performs steps S8-8 and S8-2, and ends the operation. In step S8-8, X-REVERSE is set. If it is determined in step S8-7 that the level of the Y detection signal is not MEDIUM, the processing part 104 performs step S8-9. In step S8-9, it is determined whether Y-SHORT is set.

If it is determined in step S8-9 that Y-SHORT is set, the processing part 104 performs step S8-2 and ends the operation. If it is determined in step S8-9 that Y-SHORT is not set, the processing part 104 performs step S8-10. In step S8-10, it is determined whether Y-CANCEL is set.

If it is determined in step S8-10 that Y-CANCEL is set, the processing part 104 performs step S8-2 and ends the operation. If it is determined in step S8-10 that Y-CANCEL is not set, the processing part 104 performs steps S8-11 and 58-2, and ends the operation. In step 58-11, X-NOISE is set.

If it is determined in step S8-4 that the X initial level is not HIGH, the processing part 104 performs step S8-12. In step S8-12, it is determined whether the X initial level is LOW.

If it is determined in step S8-12 that the X initial level is LOW, the processing part 104 performs step 58-13. In step 58-13, it is determined whether the level of the X detection signal is HIGH.

If it is determined in step S8-13 that the level of the X detection signal is HIGH, the processing part 104 performs step S8-2 and ends the operation. If it is determined in step S8-13 that the level of the X detection signal is not HIGH, the processing part 104 performs step S8-6.

If it is determined in step S8-12 that the X initial level is not LOW, the processing part 104 performs step S8-14. In step S8-14, it is determined whether the X initial level is MEDIUM.

If it is determine in step S8-14 that the X initial level is MEDIUM, the processing part 104 ends the operation. If it is determined in step S8-14 that the X initial level is not MEDIUM, the processing part 104 performs step S8-2 and ends the operation.

Thus, the X second wave determination operation is performed.

Next, a description will be given in detail, with reference to the accompanying drawing, of the Y second wave determination operation of step S7-4.

Figure 21:
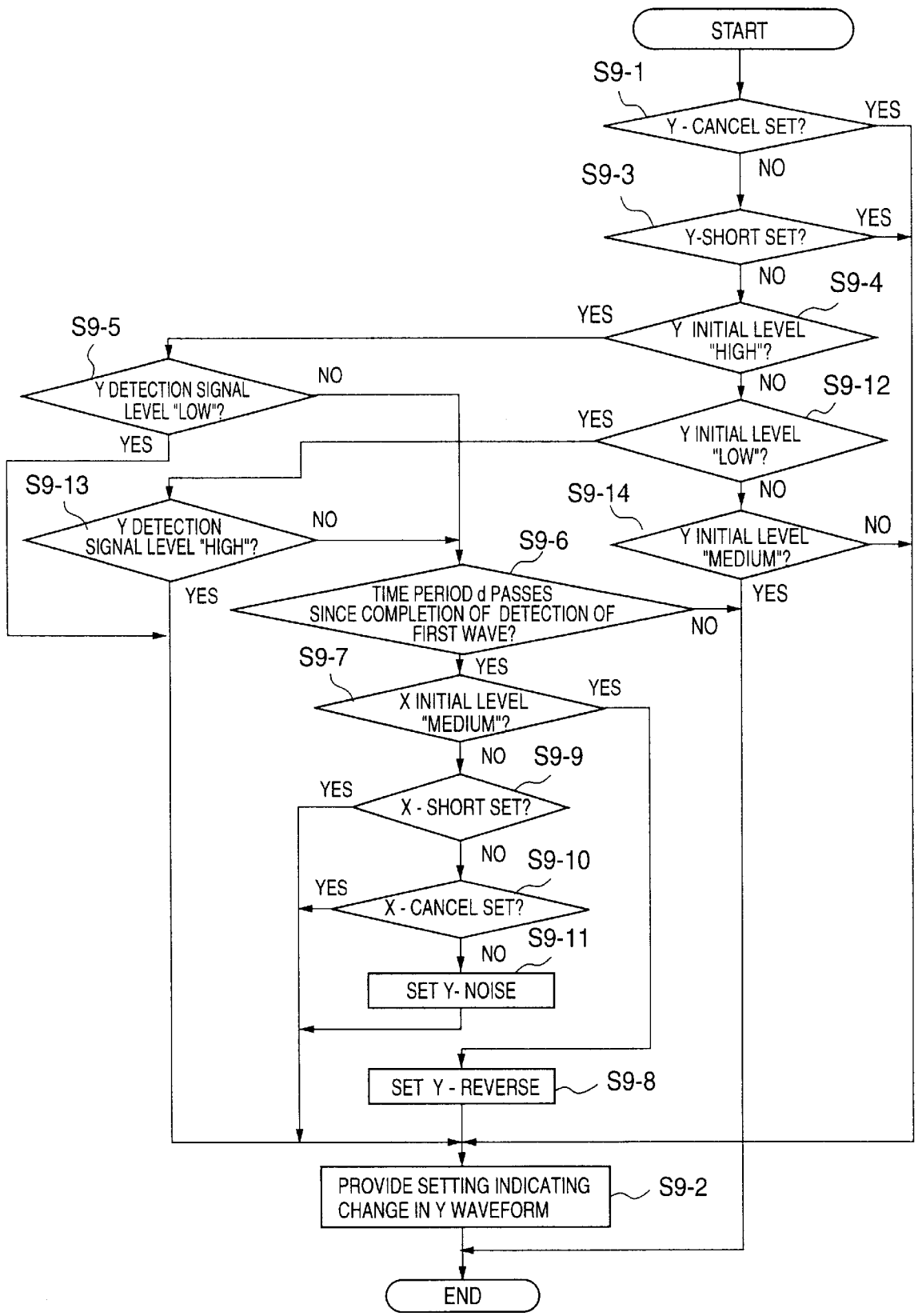
FIG. 21 is a flowchart of a Y second wave determination operation according to the embodiment of the present invention.

FIG. 21 is a flowchart of the Y second wave determination operation according to the embodiment of the present invention.

The Y second wave determination operation includes steps S9-1 through S9-14.

In step S9-1, it is determined whether Y-CANCEL is set. If it is determined in step S9-1 that the Y-CANCEL is set, the processing part 104 performs step S9-2 and ends the operation. In step S9-2, the setting indicating a change in the waveform of the Y detection signal is provided.

If it is determined in step S9-1 that Y-CANCEL is not set, the processing part 104 performs step S9-3. In step S9-3, it is determined whether BY-SHORT is set.

If it is determined in step S9-3 that Y-SHORT is set, the processing part 104 performs step S9-2 and ends the operation. If it is determined in step S9-3 that the Y-SHORT is not set, the processing part 104 performs step S9-4. In step S9-4, it is determined whether the Y initial level is HIGH.

If it is determined in step S9-4 that the Y initial level is HIGH, the processing part 104 performs step S9-5. In step S9-5, it is determined whether the level of the Y detection signal is LOW.

If it is determined in step S9-5 that the level of the Y detection signal is LOW, the processing part 104 performs step S9-2 and ends the operation. If it is determined in step S9-5 that the level of the Y detection signal is not LOW, the processing part 104 performs step S9-6. In step S9-6, it is determined whether the time period d passes since the detection of the first wave W1 is completed. The time period d, which is predetermined and preset in the processing part 104, is empirically obtained.

If it is determined in step S9-6 that the time period d does not pass since the detection of the first wave W1 is completed, the processing part 104 ends the operation. If it is determined in step S9-6 that the time period d passes since the detection of the first wave W1 is completed, the processing part 104 performs step S9-7. In step S9-7, it is determined whether the level of the X detection signal is MEDIUM.

If it is determined in step S9-7 that the level of the X detection signal is MEDIUM, the processing part 104 performs steps S9-8 and S9-2, and ends the operation. In step S9-8, Y-REVERSE is set. If it is determined in step S9-7 that the level of the X detection signal is not MEDIUM, the processing part 104 performs step S9-9. In step S9-9, it is determined whether X-SHORT is set.

If it is determined in step S9-9 that X-SHORT is set, the processing part 104 performs step S9-2 and ends the operation. If it is determined in step S9-9 that X-SHORT is not set, the processing part 104 performs step S9-10. In step S9-10, it is determined whether X-CANCEL is set.

If it is determined in step S9-10 that X-CANCEL is set, the processing part 104 performs step S9-2 and ends the operation. If it is determined in step S9-10 that X-CANCEL is not set, the processing part 104 performs steps S9-11 and S9-2, and ends the operation. In step S9-11, Y-NOISE is set.

If it is determined in step S9-4 that the Y initial level is not HIGH, the processing part 104 performs step S9-12. In step S9-12, it is determined whether the Y initial level is LOW.

If it is determined in step S9-12 that the Y initial level is LOW, the processing part 104 performs step S9-13. In step S9-13, it is determined whether the level of the Y detection signal is HIGH.

If it is determined in step S9-13 that the level of the Y detection signal is HIGH, the processing part 104 performs step S9-2 and ends the operation. If it is determined in step S9-13 that the level of the Y detection signal is not HIGH, the processing part 104 performs step S9-6.

If it is determined in step S9-12 that the Y initial level is not LOW, the processing part 104 performs step S9-14. In step S9-14, it is determined whether the Y initial level is MEDIUM.

If it is determine in step S9-14 that the Y initial level is MEDIUM, the processing part 104 ends the operation. If it is determined in step S9-14 that the Y initial level is not MEDIUM, the processing part 104 performs step S9-2 and ends the operation.

Thus, the Y second wave determination operation is performed.

Thus, according to this embodiment, an acceleration that a user intends to detect can be detected with accuracy.

According to this embodiment, the above-described program is executed in an input device. However, the program may be executed in a game apparatus. In such a case, the program may be executed from a recording medium for providing game software, such as a CD-ROM or a DVD-ROM, or after being installed into memory of the game apparatus from the recording medium. The program may also be used after being downloaded to the memory of the game apparatus via a network.

The present invention is not limited to the specifically disclosed embodiment, but variations and modifications may be made without departing from the scope of the present invention.

The present application is based on Japanese priority application No. 2000-115174 filed on Apr. 17, 2000, the entire contents of which are hereby incorporated by reference.

What is claimed is:

1. An acceleration detection device for detecting an acceleration applied in a certain direction based on detection signals corresponding to components of the acceleration in first and second directions, comprising:

a waveform detection part to obtain detected waveforms of the detection signals; and an acceleration determination part determining validity of one of the detected waveforms in consideration of another of the detected waveforms and determining whether to validate the acceleration based on the validity of the one of the detected waveforms, where the one of the detected waveforms has a level that is correctable based on a level of the other of the detected waveforms when it is determined that the one of the detected waveforms is valid.

2. The acceleration detection device as claimed in claim 1, wherein the level of the one of the detected waveforms is correctable based on the level of the other of the detected waveforms by comparing peak values of the detected waveforms.

3. The acceleration detection device as claimed in claim 1, wherein the level of the one of the detected waveforms is correctable based on the level of the other of the detected waveforms by comparing a time period in which the level of the one of the detected waveforms remains outside a predetermined range with a time period in which the level of the other of the detected waveforms remains outside the predetermined range, the predetermined range being defined by first and second threshold levels.

4. The acceleration detection device as claimed in claim 3 wherein the level of each of the detected waveforms remains at least as high as a predetermined level during the time period.

5. The acceleration detection device as claimed in claim 1, wherein the first and second directions are perpendicular to each other.

6. An acceleration detection device for detecting an acceleration applied in a certain direction based on detection signals corresponding to components of the acceleration in first and second directions, comprising:

a waveform detection part to obtain detected waveforms of the detection signals, each of the waveforms of the detection signals including first and second waves, the second wave being generated after the first wave in a direction opposite to that of the first wave with respect to a center level; and an acceleration determination part determining validity of one of the detected waveforms in consideration of another of the detected waveforms and determining whether to validate the acceleration based on the validity of the one of the detected waveforms, by determining the first wave to be the second wave when the second wave is not observed after the first wave is observed.

7. A method of detecting an acceleration applied in a certain direction based on detection signals corresponding to components of the acceleration in first and second directions, comprising:

obtaining detected waveforms of the detection signals; and determining validity of one of the detected waveforms in consideration of another of the detected waveforms and whether to validate the acceleration based on the validity of the one of the detected waveforms, where the one of the detected waveforms has a level that is correctable based on a level of the other of the detected waveforms when it is determined that the one of the detected waveforms is valid.

8. The method as claimed in claim 7, wherein the level of the one of the detected waveforms is correctable based on the level of the other of the detected waveforms by comparing peak values of the detected waveforms.

9. The method as claimed in claim 7, wherein the level of the one of the detected waveforms is correctable based on the level of the other of the detected waveforms by comparing a time period in which the level of the one of the detected waveforms remains outside a predetermined range with a time period in which the level of the other of the detected waveforms remains outside the predetermined range, the predetermined range being defined by first and second threshold levels.

10. The method as claimed in claim 7, wherein the level of each of the detected waveforms remains at least as high as a predetermined level during the time period.

11. The method as claimed in claim 7, wherein the first and second directions are perpendicular to each other.

12. A method of detecting an acceleration applied in a certain direction based on detection signals corresponding to components of the acceleration in first and second directions, comprising;

obtaining detected waveforms of the detection signals, each of the waveforms of the detection signals including first and second waves, the second wave being generated after the first wave in a direction opposite to that of the first wave with respect to a center level; and determining validity of one of the detected waveforms in consideration of another of the detected waveforms and whether to validate the acceleration based on the validity of the one of the detected waveforms, by determining the first wave to be the second wave when the second wave is not observed after the first wave is observed.

13. An input device, comprising:

an acceleration detection mechanism outputting detection signals corresponding to components of an acceleration in first and second directions;

a waveform detection part to obtain detected waveforms of the detection signals output from said acceleration detection mechanism; and an acceleration determination part determining validity of one of the detected waveforms in consideration of another of the detected waveforms and determining whether to validate the acceleration based on the validity of the one of the detected waveforms, where the one of the detected waveforms has a level that is correctable based on a level of the other of the detected waveforms when it is determined that the one of the detected waveforms is valid.

14. The input device as claimed in claim 13, wherein the level of the one of the detected waveforms is correctable based on the level of the other of the detected waveforms by comparing peak values of the detected waveforms.

15. The input device as claimed in claim 13, wherein the level of the one of the detected waveforms is correctable based on the level of the other of the detected waveforms by comparing a time period in which the level of the one of the detected waveforms remains outside a predetermined range with a time period in which the level of the other of the detected waveforms remains outside the predetermined range, the predetermined range being defined by first and second threshold levels.

16. The device as claimed in claim 13, wherein said acceleration determination part determines whether to make valid or invalid the acceleration based on a time period for which each of the waveforms remains at or below a predetermined level.

17. The input device as claimed in claim 13, wherein the first and second directions are perpendicular to each other.

18. An input device, comprising:

an acceleration detection mechanism outputting detection signals corresponding to an acceleration;

a waveform detection part detecting waveforms of the detection signals output from said acceleration detection mechanism, each of the waveforms of the detection signals including first and second waves, the second wave being generated after the first wave in a direction opposite to that of the first wave with respect to a center level; and an acceleration determination part determining validity of the acceleration based on the waveforms detected in said waveform detection part, by determining the first wave to be the second wave when the second wave is not observed after the first wave is observed.

19. A computer-readable recording medium recorded with a program which causes a computer to perform a method comprising:

obtaining detected waveforms of detection signals corresponding to components of an acceleration in first and second directions; and determining validity of one of the detected waveforms in consideration of another of the detected waveforms and whether to validate the acceleration based on the validity of the one of the detected waveforms, where the one of the detected waveforms has a level that is correctable based on a level of the other of the detected waveforms when it is determined that the one of the detected waveforms is valid.

20. The computer-readable recording medium as claimed in claim 19, wherein the level of the one of the detected waveforms is correctable based on the level of the other of the detected waveforms by comparing peak values of the detected waveforms.

21. The recording medium as claimed in claim 19, wherein the level of the one of the detected waveforms is correctable based on the level of the other of the detected waveforms by comparing a time period in which the level of the one of the detected waveforms remains outside a predetermined range with a time period in which the level of the other of the detected waveforms remains outside the predetermined range, the predetermined range being defined by first and second threshold levels.

22. The recording medium as claimed in claim 19, wherein the level of each of the detected waveforms remains at least as high as a predetermined level during the time period.

23. The computer-readable recording medium as claimed in claim 19, wherein the first and second directions are perpendicular to each other.

24. A recording medium recorded with a program which causes a computer to perform a method comprising:

obtaining detected waveforms of detection signals corresponding to components of an acceleration in first and second directions, each of the waveforms of the detection signals includes first and second waves, the second wave being generated after the first wave in a direction opposite to that of the first wave with respect to a center level; and determining validity of one of the detected waveforms in consideration of another of the detected waveforms and whether to validate the acceleration based on the validity of the one of the detected waveforms, by determining the first wave to be the second wave when the second wave is not observed after the first wave is observed.

25. A method of detecting acceleration, comprising:

obtaining detected waveforms of signals indicating movement in different directions;

validating one of the detected waveforms indicating movement in one of the directions based on at least one other detected waveform, where the one of the detected waveforms has a level that is correctable based on a level of the other of the detected waveforms when it is determined that the one of the detected waveforms is valid; and indicating acceleration in the one of the directions if said validating determines that the one of the detected waveforms is valid.

26. An acceleration detection device for detecting an acceleration applied in a certain direction based on detection signals corresponding to components of the acceleration in first and second directions, comprising:

a waveform detection part to obtain waveforms of the detection signals; and an acceleration determination part to determine validity of one of the detected waveforms in consideration of another of the detected waveforms and to determine whether to validate the acceleration based on the validity of the one of the detected waveforms, where a level of the one of the detected waveforms is correctable based on a length of a first time period in which the level of the one of the detected waveforms remains within a predetermined range defined by first and second threshold levels, the first time period being subsequent to a second time period in which the level of the one of the detected waveforms remains outside the predetermined range.

27. A method for detecting an acceleration applied in a certain direction based on detection signals corresponding to components of the acceleration in first and second directions, comprising:

obtaining waveforms of the detection signals;

determining validity of one of the detected waveforms in consideration of another of the detected waveforms; and determining whether to validate the acceleration based on the validity of the one of the detected waveforms, where a level of the one of the detected waveforms is correctable based on a length of a first time period in which the level of the one of the detected waveforms remains within a predetermined range defined by first and second threshold levels, the first time period being subsequent to a second time period in which the level of the one of the detected waveforms remains outside the predetermined range.

28. An input device, comprising:

an acceleration detection mechanism outputting detection signals corresponding to components of an acceleration in first and second directions;

a waveform detection part to obtain detected waveforms of the detection signals output from said acceleration detection mechanism; and an acceleration determination part to determine validity of one of the detected waveforms in consideration of another of the detected waveforms and to determine whether to validate the acceleration based on the validity of the one of the detected waveforms, where a level of the one of the detected waveforms is correctable based on a length of a first time period in which the level of the one of the detected waveforms remains within a predetermined range defined by first and second threshold levels, the first time period being subsequent to a second time period in which the level of the one of the detected waveforms remains outside the predetermined range.

29. A computer-readable recording medium recorded with a program which causes a computer to perform a method for detecting an acceleration applied in a certain direction based on detection signals corresponding to components of the acceleration in first and second directions, comprising:

obtaining waveforms of the detection signals;

determining validity of one of the detected waveforms in consideration of another of the detected waveforms; and determining whether to validate the acceleration based on the validity of the one of the detected waveforms, where a level of the one of the detected waveforms is correctable based on a length of a first time period in which the level of the one of the detected waveforms remains within a predetermined range defined by first and second threshold levels, the first time period being subsequent to a second time period in which the level of the one of the detected waveforms remains outside the predetermined range.

* * * * *